US011405314B2

(12) United States Patent
Yang et al.

(10) Patent No.: US 11,405,314 B2
(45) Date of Patent: *Aug. 2, 2022

(54) PACKET PROCESSING METHOD AND APPARATUS

(71) Applicant: Huawei Technologies Co., Ltd., Shenzhen (CN)

(72) Inventors: Wenle Yang, Dongguan (CN); Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

This patent is subject to a terminal disclaimer.

(21) Appl. No.: 16/748,181

(22) Filed: Jan. 21, 2020

(65) Prior Publication Data

US 2020/0186466 A1    Jun. 11, 2020

Related U.S. Application Data

(63) Continuation of application No. 15/386,085, filed on Dec. 21, 2016, now Pat. No. 10,574,572, which is a
(Continued)

(30) Foreign Application Priority Data

Jun. 25, 2014    (CN) .......................... 201410292669.2

(51) Int. Cl.
*H04L 45/74* (2022.01)
*H04L 61/00* (2022.01)
(Continued)

(52) U.S. Cl.
CPC .............. *H04L 45/74* (2013.01); *H04L 29/12* (2013.01); *H04L 41/0803* (2013.01); *H04L 45/02* (2013.01); *H04L 61/2015* (2013.01)

(58) Field of Classification Search
CPC ......... H04L 45/02; H04L 45/74; H04L 29/12; H04L 41/0803; H04L 41/0806;
(Continued)

(56) References Cited

U.S. PATENT DOCUMENTS 6,466,986 B1    10/2002    Sawyer et al.
7,757,000 B1     7/2010    Kinnear, Jr. et al.
(Continued)

FOREIGN PATENT DOCUMENTS

CN    101018193 A    8/2007
CN    101330531 A    12/2008
(Continued)

OTHER PUBLICATIONS

IEEE, "Part 3:Carrier Sense Multiple Access with Collision Detection (CSMA/CD) Access Method and Physical Layer Specifications, Amendment: Media Access Control Parameters,Physical Layers,and Management Parameters for Subscriber Access Networks", IEEE Computer Society,Std 802.3ah-2004, Sep. 7, 2004, 640 pages.
(Continued)

*Primary Examiner* — Kevin D Mew
(74) *Attorney, Agent, or Firm* — Slater Matsil, LLP

(57)    ABSTRACT

This application provides a packet processing method, which helps resolve a problem that a network node between a user terminal and a DHCP server is relatively complex. In the method, a network node of an access network receives a first packet sent by a user terminal, where the first packet is used to request an Internet Protocol IP address from a Dynamic Host Configuration Protocol DHCP server and the network node obtains a second packet, where the second packet includes the first packet, information about a port, and a Media Access Control MAC address of the user terminal, the port is a port through which the network node
(Continued)

receives the first packet, and the second packet is a packet except a DHCP packet. Additionally the network node sends the second packet to a controller.

30 Claims, 6 Drawing Sheets

Related U.S. Application Data continuation of application No. PCT/CN2015/080984, filed on Jun. 8, 2015.

(51) Int. Cl.
  *H04L 41/0803* (2022.01)
  *H04L 45/02* (2022.01)
  *H04L 61/5014* (2022.01)

(58) Field of Classification Search
  CPC . H04L 61/20; H04L 61/2007; H04L 61/2038; H04L 61/2061; H04L 61/2069; H04L 61/2076; H04L 61/2015
  See application file for complete search history.

(56) References Cited

U.S. PATENT DOCUMENTS

| | | | |
|---|---|---|---|
| 8,019,890 B2 | 9/2011 | Abe | |
| 8,291,111 B1 | 10/2012 | Kinnear, Jr. et al. | |
| 2002/0085552 A1* | 7/2002 | Tandon | H04L 47/2441 370/389 |
| 2002/0138854 A1* | 9/2002 | Desai | H04N 7/10 725/147 |
| 2003/0145073 A1* | 7/2003 | Lee | H04L 29/12301 709/223 |
| 2004/0073600 A1* | 4/2004 | Elo | H04L 41/0803 709/201 |
| 2004/0264439 A1* | 12/2004 | Doherty | H04L 29/12547 370/352 |
| 2005/0238005 A1 | 10/2005 | Chen et al. | |
| 2007/0022211 A1 | 1/2007 | Shimizu et al. | |
| 2007/0110441 A1* | 5/2007 | Saito | H04Q 11/0067 398/71 |
| 2007/0248085 A1 | 10/2007 | Volpano | |
| 2007/0254677 A1 | 11/2007 | Venkitaraman et al. | |
| 2009/0196290 A1* | 8/2009 | Zhao | H04L 61/2015 370/392 |
| 2010/0121946 A1* | 5/2010 | Claes | H04L 12/5692 709/223 |
| 2010/0122338 A1 | 5/2010 | Kataoka et al. | |
| 2010/0191813 A1 | 7/2010 | Gandhewar et al. | |
| 2010/0299414 A1 | 11/2010 | Nyman | |
| 2011/0072120 A1 | 3/2011 | Guo et al. | |
| 2012/0089713 A1 | 4/2012 | Carriere | |
| 2013/0083782 A1 | 4/2013 | Murphy et al. | |
| 2013/0097294 A1 | 4/2013 | Deng et al. | |
| 2013/0125124 A1* | 5/2013 | Kempf | H04L 61/103 718/1 |
| 2013/0201979 A1* | 8/2013 | Iyer | H04W 84/12 370/338 |
| 2013/0304887 A1 | 11/2013 | Cherian et al. | |
| 2014/0143428 A1 | 5/2014 | Zheng | |
| 2014/0280467 A1 | 9/2014 | Huang | |
| 2014/0297889 A1* | 10/2014 | Dong | G06F 9/45533 709/245 |
| 2015/0052262 A1* | 2/2015 | Chanda | H04L 45/586 709/245 |
| 2015/0052522 A1* | 2/2015 | Chanda | G06F 9/455 718/1 |
| 2015/0088827 A1* | 3/2015 | Xu | G06F 3/065 707/634 |
| 2015/0222592 A1* | 8/2015 | Andrews | H04L 43/08 709/221 |
| 2015/0341253 A1 | 11/2015 | Scheurich et al. | |

FOREIGN PATENT DOCUMENTS

| | | | |
|---|---|---|---|
| CN | 101569160 A | 10/2009 | |
| CN | 101827134 A | 9/2010 | |
| CN | 102257772 A | 11/2011 | |
| CN | 102404418 A | 4/2012 | |
| CN | 102438051 A | 5/2012 | |
| CN | 102497378 A | 6/2012 | |
| CN | 102868781 A | 1/2013 | |
| CN | 102882699 A | 1/2013 | |
| CN | 103428800 A | 12/2013 | |
| CN | 103634844 A | 3/2014 | |
| WO | 2011153679 A1 | 12/2011 | |
| WO | WO-2014108178 A1 * | 7/2014 | H04L 41/0806 |

OTHER PUBLICATIONS

International Telecommunication Union "Series G:Transmission Systems and Media, Digital Systems and Networks", Recommendation ITU-T G.988, Oct. 2010, 552 pages.
Open Networking Foundation, "OpenFlow Switch Specification", Version 1.3.3 (Protocol version 0x04), Oct. 18, 2013, pp. 1-164.

* cited by examiner

| DA | SA | Ethertype | subtype | payload | FCS |
FIG. 10
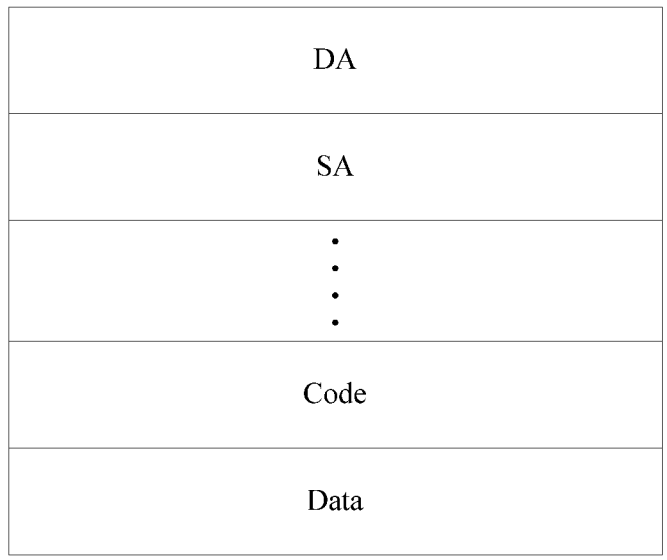
FIG. 11
| GEM header | Transaction correlation identifier | Message type | Device identifier | Message identifier | Message contents | OMCI trailer |
FIG. 12
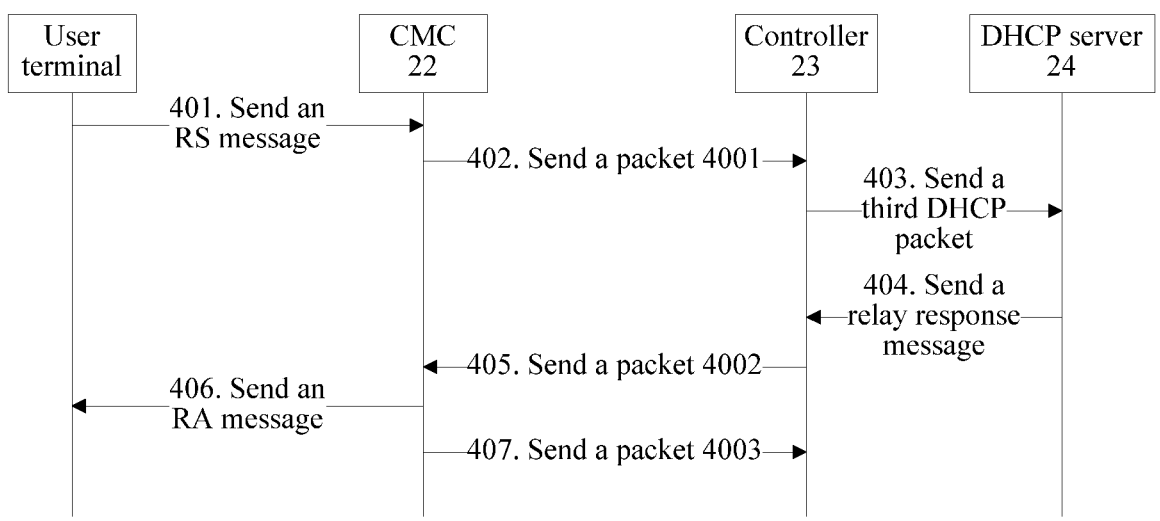
FIG. 13

PACKET PROCESSING METHOD AND APPARATUS

CROSS-REFERENCE TO RELATED APPLICATIONS

This application is a continuation of U.S. patent application Ser. No. 15/386,085, filed on Dec. 21, 2016, which is a continuation of International Application No. PCT/CN2015/080984, filed on Jun. 8, 2015, which claims priority to Chinese Patent Application No. 201410292669.2, filed on Jun. 25, 2014. All of the aforementioned applications are hereby incorporated by reference in their entireties.

TECHNICAL FIELD

The present embodiments relates to communications technologies, and in particular, to a packet processing method, a network node, and a controller.

BACKGROUND

The Dynamic Host Configuration Protocol (DHCP) is a dynamic address assignment protocol based on the Transmission Control Protocol/Internet Protocol (TCP/IP). In an actual application, a DHCP server assigns an Internet Protocol (IP) address to a user terminal that serves as a DHCP client, so as to avoid an IP address conflict between different user terminals.

If the user terminal and the DHCP server are located in different physical network segments, a DHCP relay device needs to transfer a DHCP packet between the user terminal and the DHCP server. For example, after receiving a Dynamic Host Configuration Protocol discover (DHCP Discover) packet sent by the user terminal, the DHCP relay device may generate a first DHCP packet and send the first DHCP packet to the DHCP server. The DHCP Discover packet may be used to search for the DHCP server. The first DHCP packet includes a gateway interface IP address and a Media Access Control (MAC) address of the user terminal. The gateway interface IP address is an IP address of a physical interface through which the DHCP relay device communicates with the user terminal. The DHCP relay device may further send, to the user terminal, a Dynamic Host Configuration Protocol offer (DHCP Offer) packet from the DHCP server. The DHCP Offer packet includes an IP address provided by the DHCP server to the user terminal. After receiving a Dynamic Host Configuration Protocol request (DHCP Request) packet sent by the user terminal, the DHCP relay device may generate a second DHCP packet and send the second DHCP packet to the DHCP server. The DHCP relay device may further send, to the user terminal, a Dynamic Host Configuration Protocol acknowledgement DHCP ACK) packet from the DHCP server. The DHCP ACK packet includes configuration information of the user terminal. After receiving the DHCP ACK packet, the user terminal may obtain the IP address assigned by the DHCP server to the user terminal.

A network node between the user terminal and the DHCP server needs to support a DHCP relay function, and can generate a DHCP packet. For example, the DHCP relay device may insert information such as the gateway interface IP address into a relay agent information option field, such as an option 82 field, of the received DHCP Discover packet or DHCP Request packet. The network node between the user terminal and the DHCP server further needs to support formats, customized by different operators, of option fields, and the network node between the user terminal and the DHCP server is relatively complex.

SUMMARY

In view of this, embodiments provide a packet processing method, which helps resolve a problem that a network node between a user terminal and a Dynamic Host Configuration Protocol (DHCP) server is relatively complex.

The embodiments further provide a network node and a controller.

Technical solutions provided in the embodiments are as follows.

According to a first aspect, a packet processing method is provided, including receiving, by a network node of an access network, a first packet sent by a user terminal, where the first packet is used to request an Internet Protocol (IP) address from a DHCP server and obtaining, by the network node, a second packet, where the second packet includes the first packet, information about a port, and a Media Access Control (MAC) address of the user terminal, the port is a port through which the network node receives the first packet, and the second packet is a packet except a DHCP packet. The method also includes sending, by the network node, the second packet to a controller.

In a first possible implementation manner of the first aspect, the method further includes: receiving, by the network node, a third packet sent by the DHCP server, where the third packet includes an IP address of the user terminal; and sending, by the network node, the third packet to the controller.

With reference to the first aspect or the first possible implementation manner of the first aspect, a second possible implementation manner of the first aspect is further provided, where the method further includes: receiving, by the network node, a fourth packet sent by the controller, where the fourth packet includes the third packet, the information about the port, and the MAC address of the user terminal, and the third packet includes the IP address of the user terminal; obtaining, by the network node, the third packet; and sending, by the network node, the third packet to the user terminal according to the information about the port and the MAC address of the user terminal.

With reference to the first aspect, the first possible implementation manner of the first aspect, or the second possible implementation manner of the first aspect, a third possible implementation manner of the first aspect is further provided, where after the sending, by the network node, the second packet to a controller, the method further includes: receiving, by the network node, the DHCP packet sent by the controller, where the DHCP packet includes the information about the port and the MAC address of the user terminal; and sending, by the network node, the DHCP packet to the DHCP server.

With reference to the first possible implementation manner of the first aspect or the second possible implementation manner of the first aspect, a fourth possible implementation manner of the first aspect is further provided, where the first packet is a DHCP Discover packet, and the third packet is a DHCP Offer packet; or the first packet is a DHCP Request packet, and the third packet is a DHCP ACK packet; or the first packet is a router solicitation (RS) message, the third packet is a relay response message, and the relay response message includes a router advertisement (RA) message.

With reference to the first aspect or any possible implementation manner of the first aspect, a fifth possible implementation manner of the first aspect is further provided, where a payload (payload) of the second packet includes an OpenFlow protocol (OFP) packet, and a payload of the OFP packet carries the first packet.

With reference to the fifth possible implementation manner of the first aspect, a sixth possible implementation manner of the first aspect is further provided, where the second packet is an Institute of Electrical and Electronics Engineers (IEEE) 1904.2 protocol packet, a subtype field of the IEEE 1904.2 protocol packet is used to identify that the IEEE 1904.2 protocol packet includes the OFP packet, and a payload of the IEEE 1904.2 protocol packet carries the OFP packet, the information about the port, and the MAC address of the user terminal.

With reference to the fifth possible implementation manner of the first aspect, a seventh possible implementation manner of the first aspect is further provided, where the second packet is an Ethernet operation, administration and maintenance (ETH OAM) packet, a code field of the ETH OAM packet is used to identify that the ETH OAM packet includes the OFP packet, and a data field of the ETH OAM packet carries the OFP packet, the information about the port, and the MAC address of the user terminal.

With reference to the fifth possible implementation manner of the first aspect, an eighth possible implementation manner of the first aspect is further provided, where the second packet is an optical network terminal management and control interface (OMCI) protocol packet, a message identifier field included in the OMCI protocol packet is used to identify that the OMCI protocol packet includes the OFP packet, and a message contents field included in the OMCI protocol packet carries the OFP packet, the information about the port, and the MAC address of the user terminal.

With reference to the first possible implementation manner of the first aspect or the second possible implementation manner of the first aspect, in a ninth possible implementation manner of the first aspect, the third packet included in the fourth packet is a DHCP ACK packet or an RA message, the third packet further includes a configuration parameter, and the configuration parameter includes an identifier of a configuration file and an identifier of a server that provides the configuration file; and the method further includes: after obtaining the third packet, storing, by the network node, a correspondence between the identifier of the configuration file and the MAC address of the user terminal; receiving, by the network node, a configuration file request packet sent by the user terminal, where the configuration file request packet includes the configuration parameter; and matching, by the network node, the obtained MAC address of the user terminal and the obtained configuration parameter with those in the correspondence, and sending the configuration file request packet to the server that provides the configuration file.

According to a second aspect, a packet processing method is provided, including receiving, by a controller, a first packet sent by a network node of an access network, where the first packet includes information about a port, a MAC address of a user terminal, and a second packet, the port is a port through which the network node receives the second packet, the second packet is used to request an IP address from a DHCP server, and the first packet is a packet except a DHCP packet. The method also includes obtaining, by the controller, the DHCP packet according to the second packet, where the DHCP packet includes the information about the port and the MAC address of the user terminal; and sending, by the controller, the DHCP packet to the DHCP server.

In a first possible implementation manner of the second aspect, the method further includes: receiving, by the controller, a third packet sent by the DHCP server, where the third packet includes an IP address of the user terminal; obtaining, by the controller, a fourth packet, where the fourth packet includes the third packet, the information about the port, and the MAC address of the user terminal; and sending, by the controller, the fourth packet to the network node.

With reference to the first possible implementation manner of the second aspect, a second possible implementation manner of the second aspect is further provided, where the second packet is a DHCP Discover packet, and the third packet is a DHCP Offer packet; or the second packet is a DHCP Request packet, and the third packet is a DHCP ACK packet; or the second packet is an RS message, the third packet is a relay response message, and the relay response message includes an RA message.

With reference to the first possible implementation manner of the second aspect, a third possible implementation manner of the second aspect is further provided, where the method further includes: adding, by the controller, a configuration parameter to the third packet, where the configuration parameter includes an identifier of a configuration file and an identifier of a server that provides the configuration file; and sending, by the controller, the configuration parameter to the network node by using the third packet.

According to a third aspect, a network node is provided, including: a first receiving unit, configured to receive a first packet sent by a user terminal, where the first packet is used to request an IP address from a DHCP server; a first packet obtaining unit, configured to obtain a second packet, where the second packet includes the first packet, information about a port, and a MAC address of the user terminal, the port is a port through which the network node receives the first packet, and the second packet is a packet except a DHCP packet; and a first sending unit, configured to send the second packet to a controller.

In a first possible implementation manner of the third aspect, the network node further includes: a second receiving unit, configured to receive a third packet sent by the DHCP server, where the third packet includes an IP address of the user terminal; and a second sending unit, configured to send the third packet to the controller.

With reference to the third aspect or the first possible implementation manner of the third aspect, a second possible implementation manner of the third aspect is further provided, where the network node further includes: a third receiving unit, configured to receive a fourth packet sent by the controller, where the fourth packet includes the third packet, the information about the port, and the MAC address of the user terminal, and the third packet includes the IP address of the user terminal; a second packet obtaining unit, configured to obtain the third packet from the fourth packet; and a third sending unit, configured to send the third packet to the user terminal according to the information about the port and the MAC address of the user terminal.

With reference to the first possible implementation manner of the third aspect or the second possible implementation manner of the third aspect, a third possible implementation manner of the third aspect is further provided, where the first packet is a DHCP Discover packet, and the third packet is a DHCP Offer packet; or the first packet is a DHCP Request packet, and the third packet is a DHCP ACK packet; or the first packet is an RS message, the third packet is a relay response message, and the relay response message includes an RA message.

With reference to the first possible implementation manner of the third aspect or the second possible implementation manner of the third aspect, a fourth possible implementation manner of the third aspect is further provided, where the third packet included in the fourth packet is a DHCP ACK packet or an RA message, the third packet further includes a configuration parameter, and the configuration parameter includes an identifier of a configuration file and an identifier of a server that provides the configuration file; and the network node further includes: a storage unit, configured to: after the third packet is obtained, store a correspondence between the identifier of the configuration file and the MAC address of the user terminal; a fourth receiving unit, configured to receive a configuration file request packet sent by the user terminal, where the configuration file request packet includes the configuration parameter; and a fourth sending unit, configured to match the obtained MAC address of the user terminal and the obtained configuration parameter with those in the correspondence, and send the configuration file request packet to the server that provides the configuration file.

According to a fourth aspect, a controller is provided, including: a first receiving unit, configured to receive a first packet sent by a network node of an access network, where the first packet includes information about a port, a MAC address of a user terminal, and a second packet, the port is a port through which the network node receives the second packet, the second packet is from the user terminal, the second packet is used to request an IP address from a DHCP server, and the first packet is a packet except a DHCP packet; a first obtaining unit, configured to obtain the DHCP packet according to the second packet, where the DHCP packet includes the information about the port and the MAC address of the user terminal; and a first sending unit, configured to send the DHCP packet to the DHCP server.

In a first possible implementation manner of the fourth aspect, the controller further includes: a second receiving unit, configured to receive a third packet sent by the DHCP server, where the third packet includes an IP address of the user terminal; a second obtaining unit, configured to obtain a fourth packet, where the fourth packet includes the third packet, the information about the port, and the MAC address of the user terminal; and a second sending unit, configured to send the fourth packet to the network node.

With reference to the first possible implementation manner of the fourth aspect, a second possible implementation manner of the fourth aspect is further provided, where the second packet is a DHCP Discover packet, and the third packet is a DHCP Offer packet; or the second packet is a DHCP Request packet, and the third packet is a DHCP ACK packet; or the second packet is an RS message, the third packet is a relay response message, and the relay response message includes an RA message.

With reference to the first possible implementation manner of the fourth aspect, a third possible implementation manner of the fourth aspect is further provided, where the second obtaining unit is further specifically configured to add a configuration parameter to the third packet, where the configuration parameter includes an identifier of a configuration file and an identifier of a server that provides the configuration file; and the second sending unit is further specifically configured to send the configuration parameter to the network node by using the third packet.

According to the foregoing solutions, the network node provided in the embodiments receives a first packet from a user terminal, and obtains a second packet, where the first packet is used to request an IP address from a DHCP server, and the second packet is a packet except a DHCP packet. The network node sends the second packet to a controller. The controller receives the packet from the network node, and obtains, from the packet from the network node, a packet used to request an IP address from the DHCP server. The controller obtains the DHCP packet according to the packet used to request an IP address from the DHCP server, a port through which the network node receives the first packet, and a MAC address of the user terminal. The controller may send the DHCP packet to the DHCP server. In this way, a network node of an access network may not need to generate a DHCP packet, and instead, a controller generates a DHCP packet, and the network node of the access network may not need to support a DHCP relay function either, and merely forwards a packet from the controller or a packet from another network node, which helps decrease complexity of the network node

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and ordinary persons skilled in the art may still derive other drawings from these accompanying drawings.

FIG. 10 is a schematic diagram of an Institute of Electrical and Electronics Engineers (IEEE) 1904.2 protocol packet according to an embodiment;

FIG. 11 is a schematic diagram of an Ethernet operation, administration and maintenance (ETH OAM) packet according to an embodiment;

FIG. 12 is a schematic diagram of an optical network terminal management and control interface (OMCI) protocol packet according to an embodiment;

FIG. 13 is a schematic diagram of a packet processing method according to Embodiment 2.

DETAILED DESCRIPTION OF ILLUSTRATIVE EMBODIMENTS

To make the objectives, technical solutions, and advantages of the embodiments clearer, the following clearly describes the technical solutions in the embodiments with reference to the accompanying drawings in the embodiments. Apparently, the described embodiments are some rather than all of the embodiments. All other embodiments obtained by persons of ordinary skill in the art based on the embodiments shall fall within the protection scope.

Figure 1:
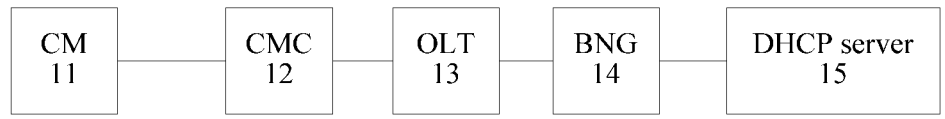
FIG. 1 is a schematic diagram of a network scenario.

FIG. 1 is a schematic diagram of a network scenario. The network scenario shown in FIG. 1 is an access scenario based on the China Data-over-Cable Service Interface Specification (C-DOCSIS). In the network scenario shown in FIG. 1, a cable modem (CM) 11 and a Dynamic Host Configuration Protocol (DHCP) server 15 are located in different network segments. The CM 11 may communicate with a cable media converter (CMC) 12, the CMC 12 may communicate with an optical line termination (OLT) 13, and the OLT 13 communicates with the DHCP server 15 by using a broadband network gateway (BNG) 14. The BNG 14 is configured to forward a packet between the OLT 13 and the DHCP server 15.

In the network shown in FIG. 1, a method for the DHCP server to dynamically configure an IP address for the CM 11 may include as follows:

The CM 11 sends a DHCP Discover packet to the CMC 12, where the DHCP Discover packet may include a MAC address of the CM 11. The CMC 12 generates a first DHCP packet according to a first port and the MAC address of the CM 11, for example, the CMC 12 adds the first port and the MAC address of the CM 11 to an option 82 field of the first DHCP packet. The first port is a port through which the CMC 12 receives the DHCP Discover packet. The CMC 12 sends the first DHCP packet to the OLT 13.

The OLT 13 may insert a second port into the option 82 field of the first DHCP packet, so as to obtain a second DHCP packet. The second port is a port through which the OLT 13 receives the first DHCP packet. The OLT 13 sends the second DHCP packet to the DHCP server 15.

The DHCP server 15 obtains an available IP address according to the MAC address of the CM 11 that is included in the received second DHCP packet. The DHCP server 15 obtains a DHCP Offer packet. The DHCP Offer packet includes the second port, the first port, and the IP address that is provided to the CM 11. The DHCP server 15 sends the DHCP Offer packet to the OLT 13, and the OLT 13 sends the DHCP Offer packet to the CMC 12. The CMC 12 sends the DHCP Offer packet to the CM 11 through the first port.

The CM 11 selects, from the received DHCP Offer packet, the IP address provided by the DHCP server 15 to the CM 11. The CM 11 obtains a DHCP Request packet. The DHCP Request packet includes an address of the DHCP server 15 and the IP address that is provided by the DHCP server 15 to the CM 11. The CM 11 sends the DHCP Request packet to the CMC 12. The CMC 12 obtains a third DHCP packet. The third DHCP packet includes the first port, an ID of the DHCP server 15, and the IP address that is assigned by the DHCP server 15 to the CM 11. The CMC 12 may send, by using a same method as that for sending the first DHCP packet, the third DHCP packet to the DHCP server 15 by using the OLT 13. The DHCP server 15 confirms that the IP address provided to the CM 11 is not being used, and sends a DHCP ACK packet to the CM 11 by using the OLT 13 and the CMC 12. After receiving the DHCP ACK packet, the CM 11 obtains the IP address assigned by the DHCP server 15 to the CM 11.

In the network scenario shown in FIG. 1, a network node, such as the CMC 12, the OLT 13, or another network node, of an access network needs to support a DHCP relay function such as processing of an option 82 field of a DHCP packet, for example: generating a DHCP packet. The network node further needs to support formats, customized by different operators, of Option fields, and the network node is relatively complex.

In view of the foregoing problem, a method for helping resolve that a network node between a user terminal and a DHCP server is relatively complex is provided. In this solution, a network node receives a first packet sent by a user terminal. A second network device may separately communicate with the user terminal and the network node. The first packet is used to request an IP address from a DHCP server. The first packet may be a DHCP Discover packet, a DHCP Request packet, or a router solicitation (RS) message. The network node obtains a second packet. The second packet includes the first packet, information about a port, and a MAC address of the user terminal, where the port is a port through which the network node receives the first packet. The network node sends the second packet to a controller. After receiving the packet sent by the network node, the controller may obtain a DHCP packet according to the packet that is included in the packet sent by the network node and that is used to request the IP address from the DHCP server. The controller sends the DHCP packet to the DHCP server or the network node. The foregoing solution may be implemented by using the following several embodiments.

Figure 2:
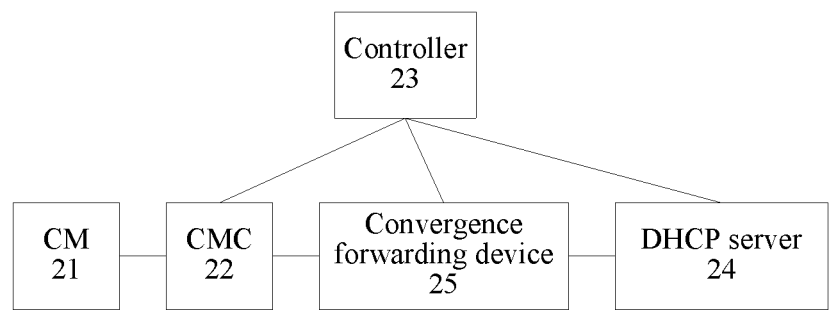
FIG. 2 is a schematic diagram of a network scenario according to an embodiment.

FIG. 2 is a schematic diagram of a network scenario according to an embodiment. In the network scenario shown in FIG. 2, a CM 21 and a DHCP server 24 are located in different network segments. In the network scenario shown in FIG. 2, a CMC 22 and a convergence forwarding device 25 are network nodes of an access network. The CM 21 may communicate with the CMC 22, the CMC 22 may separately communicate with the convergence forwarding device 25 and a controller 23, the convergence forwarding device 25 may separately communicate with the controller 23 and the DHCP server 24, and the controller 23 may separately communicate with the CMC 22, the convergence forwarding device 25, and the DHCP server 24.

The CM 21 shown in FIG. 2 may serve as a form of a user terminal, but the user terminal mentioned in the embodiments is not limited to only this form. The user terminal mentioned in the embodiments may also be a user terminal in a form such as customer premises equipment (CPE), a set top box (STB), an embedded multimedia terminal adapter (eMTA), or a computer, and examples are not listed herein one by one. The controller 23 in FIG. 2 may be deployed on one device with the convergence forwarding device 25, or may be deployed on a device that can communicate with the CMC 22, the convergence forwarding device 25, or the DHCP server 24. The controller 23 may be an access controller (AC), or may be another type of controller, and examples are not listed herein one by one. The convergence forwarding device 25 may be a forwarding device such as an OLT, a router, or a switch, and examples are not listed herein one by one.

The network node mentioned in the embodiments may be a remote access node (Remote AN). The remote access node may be any device such as CPE, a drop point unit (DPU), an optical network terminal (ONT), a cable modem (CM), a CMC, a miniature switch, a miniature digital subscriber line access multiplexer (DSLAM), a miniature cable modem terminal system (CMTS), or a miniature converged cable access platform (CCAP).

Figure 3:
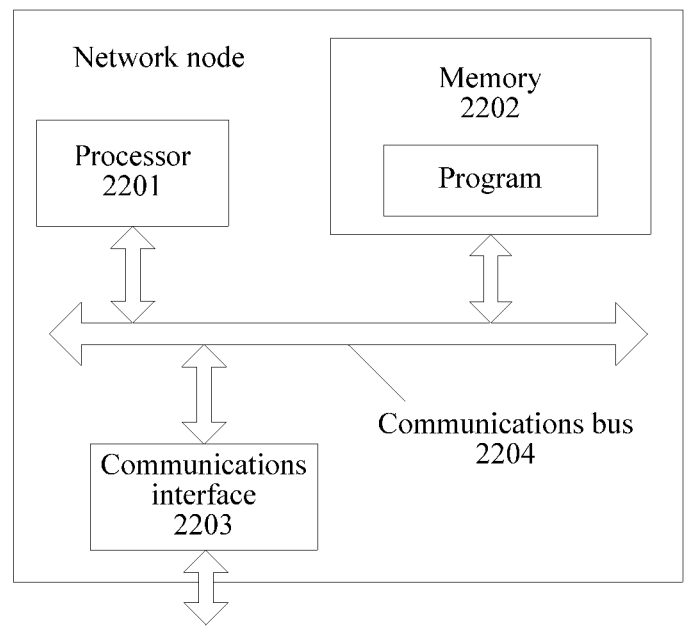
FIG. 3 is a schematic diagram of a network node according to an embodiment.

FIG. 3 is a schematic diagram of a network node according to an embodiment. The network node shown in FIG. 3 may be the CMC 22 or the convergence forwarding device 25 in the network scenario shown in FIG. 2. The network node shown in FIG. 3 may include a processor 2201, a memory 2202, and a communications interface 2203. The processor 2201, the memory 2202, and the communications interface 2203 are connected by using a communications bus 2204. The processor 2201 may be a CPU or an NP, and the processor 2201 includes at least one physical processor; and the communications interface 2203 includes at least one physical interface.

The memory 2202 is configured to store a program. Optionally, the memory 2202 may be further configured to store a correspondence between an ID of a service flow and a MAC address of a CM 21, where the service flow is used to carry a packet transmitted between the CMC 22 and the CM 21.

The processor 2201 performs the following operations according to an executable instruction included in the program read from the memory 2202.

The processor 2201 receives, by using the communications interface 2203, a first packet sent by a user terminal, where the first packet is used to request an IP address from a DHCP server 24. For example, if the network node is the CMC 22, the user terminal may be the CM 21, and the first packet may be a DHCP Discover packet, a DHCP Request packet, or an RS message.

The processor 2201 obtains the MAC address of the CM 21. Specifically, the processor 2201 obtains the MAC address of the CM 21 according to an ID of a service flow that carries the first packet and according to the correspondence that is stored in the memory 2202. For example, the service flow that carries the first packet may carry the ID of the service flow, and the processor 2201 may learn the ID of the service flow that carries the first packet.

The processor 2201 obtains a second packet, where the second packet includes the first packet, information about a first port, and the MAC address of the CM 21. The first port is a port through which the network node receives the first packet, for example, if the network node is the CMC 22, the first port may be a port through which the CMC 22 receives a DHCP Discover packet, a DHCP Request packet, or an RS message. If the network node is the convergence forwarding device 25, the first port may be a port through which the convergence forwarding device receives a DHCP packet.

The processor 2201 sends the second packet to a controller 23 by using the communications interface 2203.

Optionally, the processor 2201 may further receive, by using the communications interface 2203, a third packet sent by the DHCP server 24. The third packet includes an IP address of the user terminal, for example, the third packet may be a DHCP Offer packet, a DHCP ACK packet, or an RA message. The processor 2201 may send the third packet to the CM 21 by using the communications interface 2203.

Optionally, the processor 2201 may further receive, by using the communications interface 2203, a fourth packet sent by the controller 23, where the fourth packet includes the third packet, the information about the first port, and the MAC address of the CM 21. The processor 2201 obtains the third packet, the information about the first port, and the MAC address of the CM 21 from the fourth packet. The processor 2201 may send the third packet to the CM 21 by using the communications interface 2203 and according to the information about the first port and the MAC address of the CM 21.

Optionally, the third packet may further include a configuration parameter. The configuration parameter may include an identifier (ID) of a server configured to provide a configuration file, and an ID of the configuration file. The ID of the server configured to provide the configuration file may be information that uniquely identifies the server, for example, an address or a name of the server, and the ID of the configuration file may be information that uniquely identifies the file, for example, a name of the configuration file. The server configured to provide the configuration file may be a Trivial File Transfer Protocol (TFTP) server (not shown in FIG. 2). The processor 2201 may further obtain a correspondence between the configuration parameter and the MAC address of the CM 21. The processor 2201 may write the correspondence between the MAC address of the CM 21 and the configuration parameter into the memory 2202.

Figure 4:
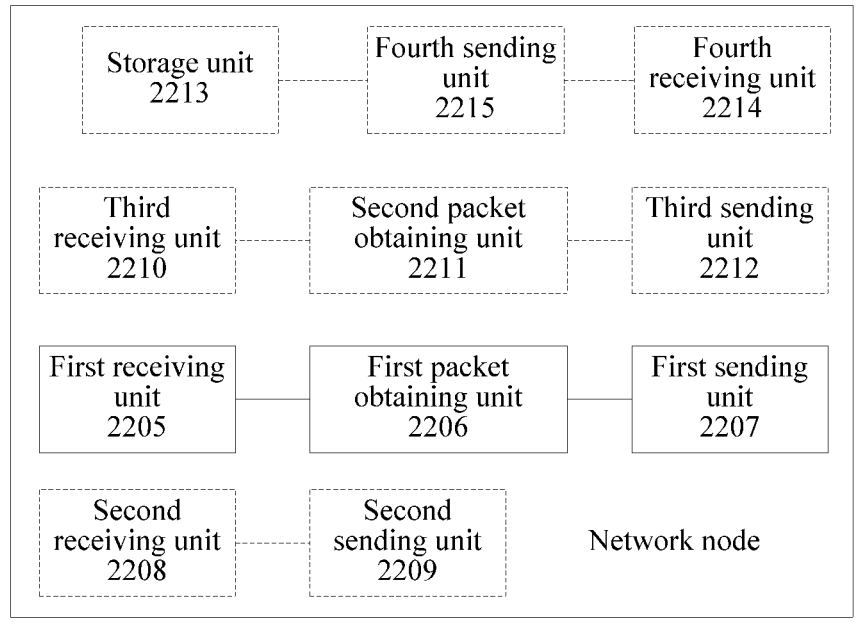
FIG. 4 is a schematic diagram of a network node according to an embodiment.

FIG. 4 is a schematic diagram of a network node according to an embodiment. The network node shown in FIG. 4 includes a first receiving unit 2205, a first packet obtaining unit 2206, and a first sending unit 2207. Optionally, the network node shown in FIG. 4 further includes a second receiving unit 2208 and a second sending unit 2209. Optionally, the network node shown in FIG. 4 further includes a third receiving unit 2210, a second packet obtaining unit 2211, and a third sending unit 2212. The network node shown in FIG. 4 further includes a storage unit 2213, a fourth receiving unit 2214, and a fourth sending unit 2215.

The network node shown in FIG. 4 and the network node shown in FIG. 3 may be a same apparatus, for example, both are the CMC 22 or the convergence forwarding device 25 in the network scenario shown in FIG. 2. It may be considered that FIG. 3 shows, from a physical perspective, content included in a network node, and FIG. 4 shows, from a logical perspective, content included in a network node. Optionally, the first receiving unit 2205, the first sending unit 2207, the second receiving unit 2208, the second sending unit 2209, the third receiving unit 2210, the third sending unit 2212, the fourth receiving unit 2214, and the fourth sending unit 2215 shown in FIG. 4 may be implemented by the communications interface 2203 shown in FIG. 3; the first packet obtaining unit 2206 and the second packet obtaining unit 2211 shown in FIG. 4 may be implemented by the processor 2201 shown in FIG. 3 according to an executable instruction stored in the memory 2202; and the storage unit 2213 shown in FIG. 4 may be implemented by the memory 2202 shown in FIG. 3.

Figure 5:
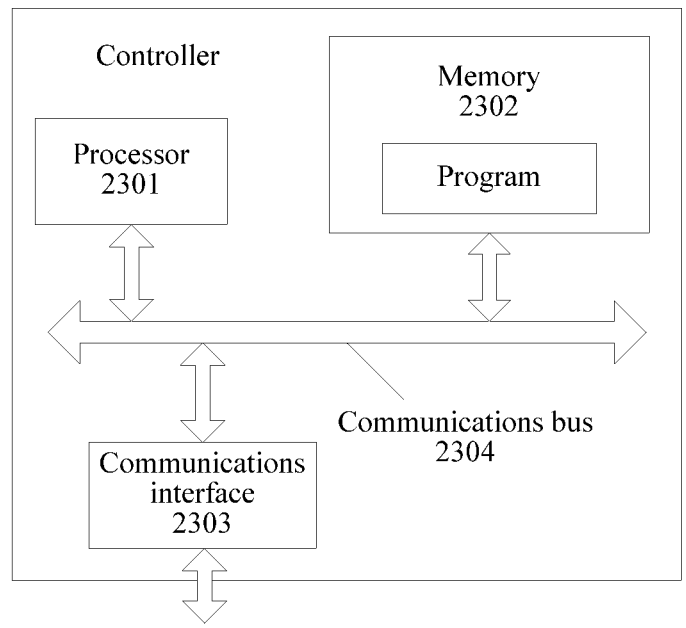
FIG. 5 is a schematic diagram of a controller according to an embodiment.

FIG. 5 is a schematic diagram of a controller according to an embodiment. The controller shown in FIG. 5 may be the controller 23 in the network scenario shown in FIG. 2. The controller shown in FIG. 5 may be deployed on a same device with a convergence forwarding device 25, or may be deployed on a device such as an AC that can communicate with a CMC 22, a convergence forwarding device 25, or a DHCP server 24. A first packet received by the controller shown in FIG. 5 from a network node is the second packet sent by the network node shown in FIG. 3 or FIG. 4. A second packet included in the first packet received by the controller shown in FIG. 5 is the first packet included in the second packet sent by the network node shown in FIG. 3 or FIG. 4.

The controller shown in FIG. 5 may include a processor 2301, a memory 2302, and a communications interface 2303. The processor 2301, the memory 2302, and the communications interface 2303 may communicate with each other by using a communications bus 2304. The processor 2301 may be a CPU or an NP, and the processor 2301 includes at least one physical processor; and the communications interface 2303 includes at least one physical interface.

The memory 2302 is configured to store a program. Optionally, the memory 2302 may further store a correspondence between a MAC address of a CM 21 and a configuration file of the CM 21. The configuration file of the CM 21 that is included in the correspondence may be an identifier used to indicate the configuration file, and the identifier used to indicate the configuration file is included in a configuration parameter.

The processor 2301 may perform the following operations according to an executable instruction included in the program read from the memory 2302.

The processor 2301 receives, by using the communications interface 2303, a first packet sent by a network node, where the network node may be the CMC 22 or the convergence forwarding device 25 in the network scenario shown in FIG. 2. The first packet is a packet except a DHCP packet, and the first packet includes a second packet, information about a port, and a MAC address of a user terminal, where the port is a port through which the network node receives the second packet. The second packet is a packet used to request an IP address from the DHCP server 24. For example, if the network node is the CMC 22, the second packet may be a DHCP Discover packet, a DHCP Request packet, or an RS message. If the network node is the convergence forwarding device 25, a DHCP packet that is sent by the CMC 22 and that is received by the convergence forwarding device 25 is generated by the controller 23.

The processor 2301 obtains the second packet, information about a first port, and the MAC address of the CM 21 from the first packet. The processor 2301 obtains the DHCP packet according to the second packet, where the DHCP packet includes the information about the first port and the MAC address of the CM 21. For example, the processor 2301 may insert the information about the first port and the MAC address of the CM 21 into an option 82 field included in the received second packet, so as to obtain the DHCP packet.

The processor 2301 sends the DHCP packet to the DHCP server 24 or the network node by using the communications interface 2303. For example, the processor 2301 sends the DHCP packet to the DHCP server 24 by using the communications interface 2303; or the processor 2301 sends the DHCP packet to the network node by using the communications interface 2303, and the network node sends the DHCP packet to the DHCP server 24.

Optionally, the processor 2301 may further receive, by using the communications interface 2303, a third packet sent by the DHCP server 24. The third packet includes an IP address assigned by the DHCP server 24 to the user terminal. If the second packet included in the first packet received by the controller 23 is a DHCP Discover packet, the third packet is a DHCP Offer packet; if the second packet included in the first packet received by the controller 23 is a DHCP Request packet, the third packet is a DHCP ACK packet; or if the second packet included in the first packet received by the controller 23 is an RS message, the third packet is an RA message.

After receiving the third packet, the processor 2301 obtains a fourth packet. For example, the third packet may further include the MAC address of the CM 21, and the processor 2301 may obtain, from the memory 2302, the information about the first port corresponding to the MAC address of the CM 21. The processor 2301 may generate the fourth packet according to the third packet, the information about the first port, and the MAC address of the CM 21.

The processor 2301 may send the fourth packet to the network node by using the communications interface 2303. For example, if the network node is the CMC 22, the processor 2301 may send the fourth packet to the CMC 22 by using the communications interface 2303. If the network node is the convergence forwarding device, the processor 2301 may send the fourth packet to the convergence forwarding device 25 by using the communications interface 2303, and the convergence forwarding device 25 sends the fourth packet to the CMC 22.

Figure 6:
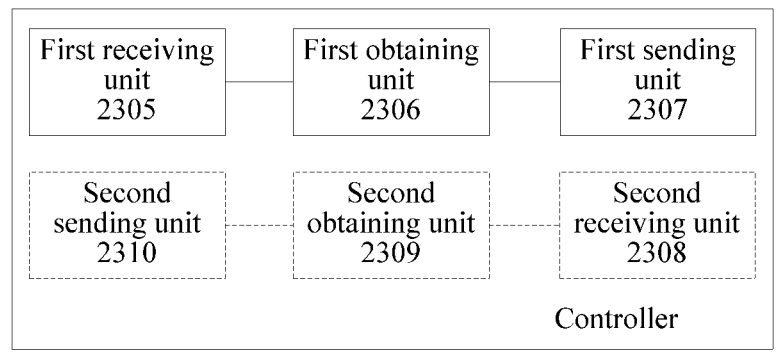
FIG. 6 is a schematic diagram of a controller according to an embodiment.

FIG. 6 is a schematic diagram of a controller according to an embodiment. The controller shown in FIG. 6 includes a first receiving unit 2305, a first obtaining unit 2306, and a first sending unit 2307. Optionally, the controller shown in FIG. 6 further includes a second receiving unit 2308, a second obtaining unit 2309, and a second sending unit 2310. Optionally, the controller shown in FIG. 6 further includes a storage unit (not shown in FIG. 6).

The controller shown in FIG. 6 and the controller shown in FIG. 5 may be a same apparatus, for example, both are the controller 23 in the network scenario shown in FIG. 2. It may be considered that FIG. 5 shows, from a physical perspective, content included in a controller, and FIG. 6 shows, from a logical perspective, content included in a controller. Optionally, the first receiving unit 2305, the first sending unit 2307, the second receiving unit 2308, and the second sending unit 2310 shown in FIG. 6 may be implemented by the communications interface 2303 shown in FIG. 5; the first obtaining unit 2306 and the second obtaining unit 2309 shown in FIG. 6 may be implemented by the processor 2301 shown in FIG. 5 according to an executable instruction stored in the memory 2302; and the storage unit included in the controller shown in FIG. 6 may be implemented by the memory 2302 shown in FIG. 5.

Figure 7:
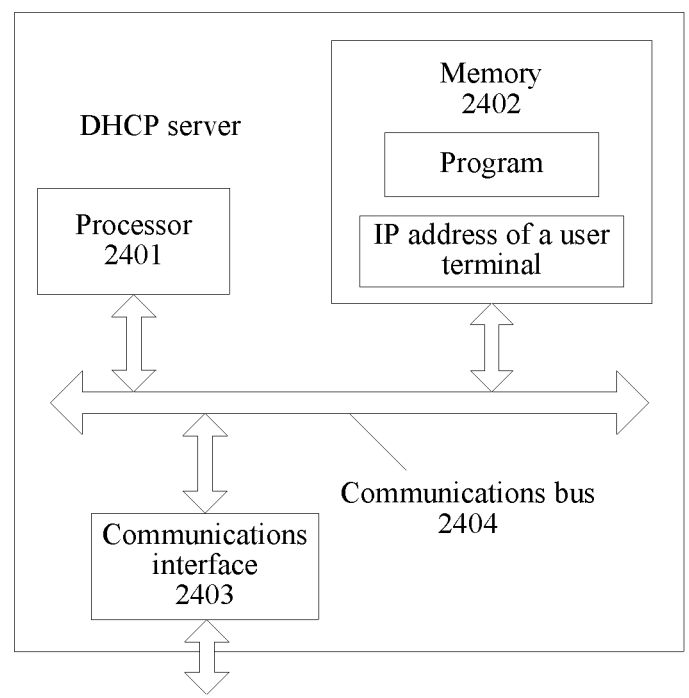
FIG. 7 is a schematic diagram of a Dynamic Host Configuration Protocol (DHCP) server according to an embodiment.

FIG. 7 is a schematic diagram of a DHCP server according to an embodiment. The DHCP server shown in FIG. 7 may be the DHCP server 24 in the network scenario shown in FIG. 2. The DHCP server shown in FIG. 7 may include a processor 2401, a memory 2402, and a communications interface 2403. The processor 2401, the memory 2402, and the communications interface 2403 may communicate with each other by using a communications bus 2404. The processor 2401 may be a CPU, and the processor 2401 may include at least one physical processor; and the communications interface 2403 may include at least one physical interface.

The memory 2402 is configured to store a program and an IP address of a user terminal, for example, the IP address of the user terminal may be an IP address of a CM 21.

The processor 2401 performs the following operations according to an executable instruction included in the program read from the memory 2402.

The processor 2401 receives, by using the communications interface 2403, a DHCP packet sent by the controller 23, where the DHCP packet includes information about a first port and a MAC address of the CM 21. The DHCP packet may be a packet obtained by the controller 23 according to a DHCP Discover packet; or the DHCP packet may be a packet obtained by the controller 23 according to a DHCP Request packet; or the DHCP packet may be a packet obtained by the controller 23 according to an RS message.

The processor 2401 may select, from the memory 2402 according to the MAC address of the CM 21, an IP address that is not being used.

Optionally, the processor 2401 may further obtain a third packet according to the received DHCP packet and the selected IP address, where the third packet includes the information about the first port, the MAC address of the CM 21, and an IP address that is assigned to the user terminal. If the DHCP packet is a packet obtained by the controller 23 according to a DHCP Discover packet, the third packet is a DHCP Offer packet; if the DHCP packet may be a packet obtained by the controller 23 according to a DHCP Request packet, the third packet is a DHCP ACK packet; or if the DHCP packet may be a packet obtained by the controller 23 according to an RS message, the third packet is an RA message.

The processor 2401 may send the third packet to a network node by using the communications interface 2403, where the network node may be the convergence forwarding device 25 or the CMC 22 shown in FIG. 2.

Figure 8:
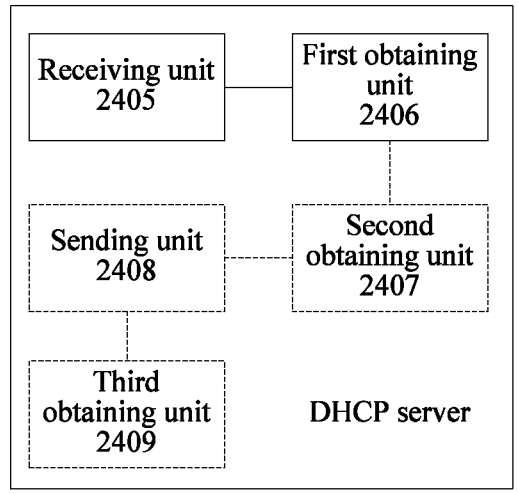
FIG. 8 is a schematic diagram of a DHCP server according to an embodiment.

FIG. 8 is a schematic diagram of a DHCP server according to an embodiment. The DHCP server shown in FIG. 8 includes a receiving unit 2405 and a first obtaining unit 2406. Optionally, the DHCP server shown in FIG. 8 further includes at least one of a second obtaining unit 2407, a sending unit 2408, or a third obtaining unit 2409. The DHCP server shown in FIG. 8 further includes a storage unit (not shown in FIG. 8).

The DHCP server shown in FIG. 8 and the DHCP server shown in FIG. 7 may be a same apparatus, for example, both are the DHCP server 24 in the network scenario shown in FIG. 2. It may be considered that FIG. 7 shows, from a physical perspective, content included in a DHCP server, and FIG. 8 shows, from a logical perspective, content included in a DHCP server. Optionally, the receiving unit 2405 and the sending unit 2408 shown in FIG. 8 may be implemented by the communications interface 2403 shown in FIG. 7; and the first obtaining unit 2406, the second obtaining unit 2407, and the third obtaining unit 2409 shown in FIG. 8 may be implemented by the processor 2401 shown in FIG. 7 according to an executable instruction stored in the memory 2402.

Embodiment 1

Figure 9:
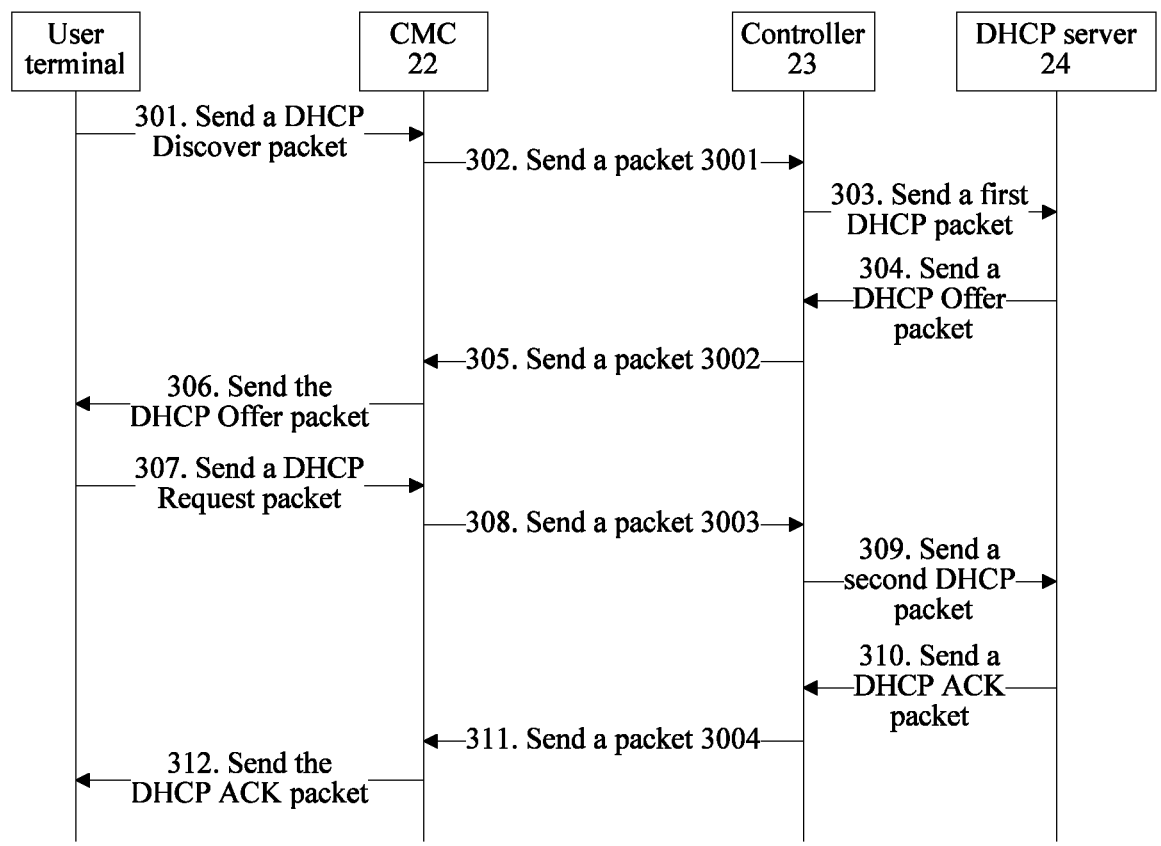
FIG. 9 is a schematic diagram of a packet processing method according to Embodiment 1.

FIG. 9 is a schematic diagram of a packet processing method according to Embodiment 1. In the method provided in Embodiment 1, a controller 23 has a DHCP Relay function, and a CMC 22 and a convergence forwarding device 25 may have no DHCP Relay function. The packet processing method provided in Embodiment 1 is described in detail in the following with reference to FIG. 2 to FIG. 8.

301. A user terminal sends a DHCP Discover packet to the CMC 22.

For example, the DHCP Discover packet is used to discover a DHCP server 24 and is a packet for requesting an IP address from the DHCP server 24.

That the user terminal is a CM 21 is used as an example, and the CM 21 may send a DHCP Discover packet to the CMC 22 by using a service flow. The service flow may carry an ID of the service flow, and a correspondence exists between the ID of the service flow and a MAC address of the CM 21.

That the user terminal is CPE is used as an example, and the CPE sends a DHCP Discover packet in a broadcast manner. The CM 21 may forward the DHCP Discover packet to the CMC 22 by using a service flow. The service flow may carry an ID of the service flow, and a correspondence exists between the ID of the service flow and a MAC address of the CM 21. A same operation procedure as that of the CPE may be used by another user terminal such as an STB or an eMTA, and details are not described herein.

302. The CMC 22 sends a packet 3001 to the controller 23.

For example, the packet 3001 includes the DHCP Discover packet, information about a first port, and the MAC address of the CM 21. The packet 3001 is a packet except a DHCP packet; and the first port is a port through which the CMC 22 receives the DHCP Discover packet, and the first port may be a physical port or a logical port.

When an Ethernet passive optical network (EPON) or a next-generation EPON exists between a remote access node and the convergence forwarding device, a layer-2 protocol packet is an Ethernet packet such as an Institute of Electrical and Electronics Engineers (IEEE) 1904.2 packet or an Ethernet operation, administration and maintenance (ETH OAM) packet.

The packet 3001 may be an IEEE 1904.2 protocol packet shown in FIG. 10. A subtype field included in the IEEE 1904.2 protocol packet may be used to identify that the IEEE 1904.2 protocol packet includes an OFP packet. A payload included in the IEEE 1904.2 protocol packet may carry the OFP packet, and a payload included in the OFP packet may carry the DHCP Discover packet, the information about the first port, and the MAC address of the CM 21. Alternatively, a payload included in the IEEE 1904.2 protocol packet may carry the OFP packet, the information about the first port, and the MAC address of the CM 21, and a payload of the OFP packet may carry the DHCP Discover packet. For example, the subtype field included in the IEEE 1904.2 protocol packet may be set to a first numerical value, where the first numerical value may identify that the payload of the IEEE 1904.2 protocol packet carries the OFP packet. An option field may be further added after the OFP packet included in the payload of the IEEE 1904.2 protocol packet, where the option field may be used to identify that the information about the first port and the MAC address of the CM 21 are carried after the option field. Alternatively, the subtype field included in the IEEE 1904.2 protocol packet may be set to 0xFE. In the IEEE 1904.2 protocol packet whose subtype field is set to 0xFE, an organization unique identifier (OUI) field is used to identify that the payload includes organization-specific extensions (organization-specific extensions) content and the message content carries the OFP packet.

The packet 3001 may be an ETH OAM packet shown in FIG. 11. A Code field included in the ETH OAM packet may be used to identify that the ETH OAM packet includes an OFP packet. A Data field included in the ETH OAM packet may carry the OFP packet, and a payload included in the OFP packet may carry the DHCP Discover packet, the information about the first port, and the MAC address of the CM 21. Alternatively, a Data field included in the ETH OAM packet may carry the OFP packet, the information about the first port, and the MAC address of the CM 21, and a payload of the OFP packet may carry the DHCP Discover packet. For example, the Code field included in the ETH OAM packet may be set to 0xFE. An OUI field may identify that an organization-specific extensions field in the Data field of the ETH OAM packet carries the OFP packet.

When a gigabit-capable passive optical network (GPON) or a next-generation GPON exists between the remote access node and the convergence forwarding device, a layer-2 protocol packet is an optical network unit management and control interface (OMCI) protocol packet.

The packet 3001 may be an OMCI protocol packet shown in FIG. 12. The OMCI protocol packet includes a GPON encapsulation method (GEM) header field, a transaction correlation identifier field, a message type field, a device identifier field, a message identifier (Message identifier) field, a message contents field, and an OMCI trailer (OMCI trailer) field. For meanings of the fields included in the OMCI protocol packet, reference may be made to related descriptions in G.984.4 (June 2004) of International Telecommunication Union Telecommunication Standardization Sector (ITU-T).

In this embodiment, an OpenFlow management entity (ME) is defined in the OMCI protocol, and a format of the OpenFlow ME may include: an attribute field and an action field The attribute field may include: an ME identifier (ID), an OpenFlow version, an OpenFlow Message, a Circuit ID, and a Remote ID. The ME identifier is used to identify the OpenFlow ME. The OpenFlow version may be used to identify an OpenFlow version number. The OpenFlow Message is used to carry the OFP packet. The Circuit ID is used to identify first access information of a user, for example, the information about the first port. The Remote ID is used to identify second access information of the user, for example, the MAC address of the CM 21. Actions may include actions such as Create, Delete, Get, and Set. Create may be used to create the OpenFlow ME or create an attribute of the OpenFlow ME, Delete may be used to delete the OpenFlow ME or an attribute of the OpenFlow ME, Get may be used to get all attributes of the OpenFlow ME or an attribute of the OpenFlow ME, and Set may be used to set all the attributes of the OpenFlow ME or an attribute of the OpenFlow ME.

The Message identifier of the OMCI protocol packet mentioned in this embodiment may be used to identify a corresponding OpenFlow ME. Content included in the Message contents of the OMCI protocol packet may be generated according to the OpenFlow ME. The Message contents of the OMCI protocol packet may carry the OFP packet.

For example, a first receiving unit 2205 of the CMC 22 receives the DHCP Discover packet sent by the CM 21. A first packet obtaining unit 2206 obtains the information about the first port and the MAC address of the CM 21. The first packet obtaining unit 2206 may generate the packet 3001 according to the DHCP Discover packet, the information about the first port, and the MAC address of the CM 21. A storage unit 2213 may store the correspondence between the ID of the service flow and the MAC address of the CM 21. The first packet obtaining unit 2206 may obtain the MAC address of the CM 21 according to the ID of the service flow that carries the DHCP Discover packet and according to the correspondence that is stored in the storage unit 2213.

For example, a first sending unit 2207 of the CMC 22 may send the packet 3001 to the controller 23; or a first sending unit 2207 may send the packet 3001 to the convergence forwarding device 25, and the convergence forwarding device 25 sends the packet 3001 to the controller 23. The first sending unit 2207 may send the packet 3001 to the controller 23 in a tunnel manner. Optionally, in a process in which the convergence forwarding device 25 sends the packet 3001 to the controller 23, information about a port through which the convergence forwarding device 25 receives the packet 3001 may be carried in the packet 3001.

303. The controller 23 sends a first DHCP packet to the DHCP server 24.

For example, a first receiving unit 2305 of the controller 23 receives the packet 3001 sent by the CMC 22. A first obtaining unit 2306 obtains the DHCP Discover packet, the information about the first port, and the MAC address of the CM 21 from the packet 3001. The first obtaining unit 2306 obtains the first DHCP packet according to the DHCP Discover packet, the information about the first port, and the MAC address of the CM 21, where the first DHCP packet includes the information about the first port and the MAC address of the CM 21. For example, the first obtaining unit 2306 may insert the information about the first port and the MAC address of the CM 21 into an option 82 field of the DHCP Discover packet, so as to generate the first DHCP packet. A first sending unit 2307 may send the first DHCP packet to the DHCP server 24.

For example, the first sending unit 2307 may send the first DHCP packet to the DHCP server 24 by using the convergence forwarding device 25; or the first sending unit 2307 may directly send the first DHCP packet to the DHCP server 24.

Steps 304 to 306 are optional steps. The DHCP server 24 may send a DHCP Offer packet to the user terminal by using the convergence forwarding device 25 and the CMC 22; or the DHCP server 24 may send a DHCP Offer packet to the user terminal by using a method of steps 304 to 306 shown in FIG. 9.

304. The DHCP server 24 sends the DHCP Offer packet to the controller 23.

For example, a receiving unit 2405 of the DHCP server 24 receives the first DHCP packet from the controller 23. A first obtaining unit 2406 may obtain the MAC address of the CM 21 from the first DHCP packet. The first obtaining unit 2406 may select an IP address for the user terminal according to the MAC address of the CM 21.

For example, a second obtaining unit 2407 of the DHCP server 24 may obtain the DHCP Offer packet according to the IP address that is obtained by the first obtaining unit 2406 and that is selected for the user terminal. The DHCP Offer packet includes the IP address provided by the DHCP server 24 to the user terminal, the information about the first port, and the MAC address of the CM 21. Optionally, the DHCP Offer packet further includes an IP address of the DHCP server 24.

For example, a sending unit 2408 sends the DHCP Offer packet to the controller 23; or a sending unit 2410 sends the DHCP Offer packet to the controller 23 by using the convergence forwarding device 25.

305. The controller 23 sends a packet 3002 to the CMC 22.

For example, the packet 3002 includes the DHCP Offer packet, the information about the first port, and the MAC address of the CM 21. The packet 3002 may also be in a format of the packet shown in FIG. 10, FIG. 11, or FIG. 12. The packet 3002 may be in a format that is the same as that of the packet 3001, or may be in a format that is different from that of the packet 3001. A difference between the packet 3002 and the packet 3001 lies in that a payload of an OFP packet included in the packet 3002 carries the DHCP Offer packet.

For example, a second receiving unit 2308 of the controller 23 receives the DHCP Offer packet from the DHCP server 24 or the convergence forwarding device 25. A second obtaining unit 2309 may obtain the packet 3002 according to the DHCP Offer packet, the obtained information about the first port, and the obtained MAC address of the CM 21. A second sending unit 2310 may send the packet 3002 to the convergence forwarding device 25, and the convergence forwarding device 25 sends the packet 3002 to the CMC 22; or a second sending unit 2310 may directly send the packet 3002 to the CMC 22. The second obtaining unit 2309 may obtain the information about the first port and the MAC address of the CM 21 from the DHCP Offer packet.

306. The CMC 22 sends the DHCP Offer packet to the user terminal.

For example, a third receiving unit 2210 of the CMC 22 receives the packet 3002. A second packet obtaining unit 2211 may obtain the DHCP Offer packet, the information about the first port, and the MAC address of the CM 21 from the packet 3002. A third sending unit 2212 may send the DHCP Offer packet to the user terminal according to the information about the first port and the MAC address of the CM 21.

If the user terminal is the CM 21, the IP address that is included in the DHCP Offer packet and that is provided by the DHCP server 24 to the user terminal is an IP address of the CM 21; or if the user terminal is CPE connected to the CM 21, the IP address that is included in the DHCP Offer packet and that is provided by the DHCP server 24 to the user terminal is an IP address of the CPE.

307. The user terminal sends a DHCP Request packet to the CMC 22.

That the user terminal is the CM 21 is used as an example, and the CM 21 may send the DHCP Request packet to the CMC 22 through a physical port or a logical port. A correspondence exists between a service flow that carries the DHCP Request packet and the MAC address of the CM 21. The DHCP Request packet sent by the CM 21 may include an IP address provided by the DHCP server 24 to the CM 21. Optionally, the DHCP Request packet sent by the CM 21 may further include an address of the DHCP server 24.

That the user terminal is CPE is used as an example, and the CPE sends the DHCP Request packet to the CMC 22 through a physical port or a logical port of the CM 21. The DHCP Request packet includes an IP address provided by the DHCP server 24 to the CPE. Optionally, the DHCP Request packet may further include an address of the DHCP server 24. The CM 21 may forward the DHCP Request packet to the CMC 22 by using a service flow.

308. The CMC 22 sends a packet 3003 to the controller 23.

For example, the packet 3003 includes the DHCP Request packet, information about a second port, and the MAC address of the CM 21. The DHCP Request packet may include the IP address provided by the DHCP server 24 to the user terminal. The second port is a port through which the CMC 22 receives the DHCP Request packet, and the second port may be a physical port or a logical port. The second port may be the same as the first port or may be different from the first port. The packet 3003 may be in a format of the packet shown in FIG. 10, FIG. 11, or FIG. 12. The packet 3003 may be in a packet format that is the same as that of the packet 3001, or may be in a packet format that is different from that of the packet 3001. A difference between the packet 3003 and the packet 3001 lies in that an OFP packet included in the packet 3003 carries the DHCP Request packet.

For example, the first receiving unit 2205 of the CMC 22 may receive the DHCP Request packet sent by the CM 21. The first packet obtaining unit 2206 may obtain the information about the second port and the MAC address of the CM 21. A method for the first packet obtaining unit 2206 to obtain the MAC address of the CM 21 may be the same as that in step 302. The first packet obtaining unit 2206 may generate the packet 3003 according to the DHCP Request packet, the information about the second port, and the MAC address of the CM 21.

For example, the first sending unit 2207 of the CMC 22 may send the packet 3003 to the convergence forwarding device 25, and the convergence forwarding device 25 sends the packet 3003 to the controller 23; or the first sending unit 2207 of the CMC 22 may directly send the packet 3003 to the controller 23. In a process in which the convergence forwarding device 25 sends the packet 3003 to the controller 23, information about a port through which the convergence forwarding device 25 receives the packet 3003 may be carried in the packet 3003.

309. The controller 23 sends a second DHCP packet to the DHCP server 24.

For example, the first receiving unit 2305 of the controller 23 receives the packet 3003 sent by the CMC 22. The first obtaining unit 2306 obtains the DHCP Request packet, the information about the second port, and the MAC address of the CM 21 from the packet 3003. The first obtaining unit 2306 obtains the second DHCP packet, where the second DHCP packet includes the IP address provided by the DHCP server 24 to the user terminal, the information about the second port, and the MAC address of the CM 21. For example, the first obtaining unit 2306 may add the information about the second port and the MAC address of the CM 21 to an option 82 field of the DHCP Request packet, so as to generate the second DHCP packet. Optionally, the second DHCP packet may further include the address of the DHCP server 24. The first sending unit 2307 may send the second DHCP packet to the DHCP server 24 by using the method in step 303.

Steps 310 to 312 are optional steps. The DHCP server 24 sends a DHCP ACK packet to the user terminal by using the convergence forwarding device 25 and the CMC 22; or the DHCP server 24 may send the DHCP ACK packet to the user terminal by using a method of steps 310 to 312 shown in FIG. 9.

310. The DHCP server 24 sends the DHCP ACK packet to the controller 23.

For example, the receiving unit 2405 of the DHCP server 24 receives the second DHCP packet from the controller 23. The first obtaining unit 2406 may obtain, from the second DHCP packet, the MAC address of the CM 21 and the IP address that is provided by the DHCP server 24 to the user terminal.

For example, the second obtaining unit 2407 of the DHCP server 24 may obtain the DHCP ACK packet when the first obtaining unit 2406 determines that the IP address provided to the user terminal is not being used. The DHCP ACK packet includes the IP address assigned to the user terminal. The DHCP ACK packet further includes the information about the first port and the MAC address of the CM 21. The sending unit 2410 sends the DHCP ACK packet to the controller 23; or the sending unit 2410 sends the DHCP ACK packet to the controller 23 by using the convergence forwarding device 25.

Optionally, the DHCP ACK packet further includes a configuration parameter, where the configuration parameter includes an ID of a configuration file and an ID of a server that provides the configuration file.

311. The controller 23 sends a packet 3004 to the CMC 22.

For example, the packet 3004 includes the DHCP ACK packet, the information about the second port, and the MAC address of the CM 21. The packet 3004 may be in a format of the packet shown in FIG. 10, FIG. 11, or FIG. 12. The packet 3004 may be in a packet format that is the same as that of the packet 3002, or may be in a packet format that is different from that of the packet 3002. A difference between the packet 3004 and the packet 3002 lies in that an OFP packet included in the packet 3004 carries the DHCP ACK packet.

For example, the second receiving unit 2308 of the controller 23 receives the DHCP ACK packet from the DHCP server 24 or the convergence forwarding device 25. The second obtaining unit 2309 may obtain the packet 3004 according to the DHCP ACK packet, the obtained information about the second port, and the obtained MAC address of the CM 21. The second sending unit 2310 may send the packet 3004 to the convergence forwarding device 25, and the convergence forwarding device 25 sends the packet 3004 to the CMC 22; or the second sending unit 2310 may directly send the packet 3004 to the CMC 22.

312. The CMC 22 sends the DHCP ACK packet to the user terminal.

For example, the third receiving unit 2210 of the CMC 22 receives the packet 3004. The second packet obtaining unit 2211 may obtain the DHCP ACK packet, the information about the second port, and the MAC address of the CM 21 from the packet 3004. The third sending unit 2212 may send the DHCP ACK packet to the user terminal according to the second port and the MAC address of the CM 21. If the user terminal is CPE connected to the CM 21, the CM 21 further sends the DHCP ACK packet to the CPE.

In the method provided in Embodiment 1, the CMC 22 sends, to the controller 23, a packet that includes the DHCP Discover packet or the DHCP Request packet, and the controller 23 performs DHCP relay processing, so as to generate the first DHCP packet or the second DHCP packet, that is, the controller 23 has a DHCP relay function, and the CMC 22 may have no DHCP relay function. In this way, a network node such as the CMC 22 does not need to support a DHCP protocol, thereby decreasing complexity of the network node.

That the user terminal is the CM 21 is used as an example, and after step 311, the method provided in Embodiment 1 may further include: sending, by the controller 23, a correspondence between a configuration parameter and the MAC address of the CM 21 to the CMC 22 by using the packet 3004, where the configuration parameter includes an ID of a configuration file and an ID of a server that provides the configuration file.

Optionally, after step 312, the method provided in Embodiment 1 may further include: receiving, by the CMC 22, a configuration file request packet from the CM 21, where the configuration file request packet includes a configuration parameter; and determining, by the CMC 22, that the configuration parameter included in the configuration file request packet and the MAC address of the CM 21 are the same as those in the correspondence delivered by the controller 23, and requesting the configuration file from the server that provides the configuration file.

For example, the CMC 22 may obtain the MAC address of the CM 21 by using the method in step 302 in Embodiment 1. The storage unit 2213 of the CMC 22 may store the correspondence delivered by the controller 23, where the correspondence includes the configuration parameter and the MAC address of the CM 21. A fourth receiving unit 2214 receives the configuration file request packet sent by the CM 21, where the configuration file request packet is used to request the configuration file from the server that provides the configuration file. The first packet obtaining unit 2206 may determine, according to the stored correspondence, that the configuration parameter included in the configuration file request packet is correct. After the first packet obtaining unit 2206 determines that the configuration parameter is correct, a fourth sending unit 2215 sends the configuration file request packet to the server that provides the configuration file.

Optionally, the method provided in Embodiment 1 may further include: determining, by the CMC 22, that the configuration parameter included in the configuration file request packet and the obtained MAC address of the CM 21 are different from those in the correspondence delivered by the controller 23, and notifying the user terminal that the configuration file is requested unsuccessfully.

Optionally, the method provided in Embodiment 1 may further include: forwarding, by the CMC 22 to the user terminal, the configuration file sent by the server that provides the configuration file, so that the user terminal completes, by using the configuration file, configuration before assessing a network.

For example, the fourth receiving unit 2214 included in the CMC 22 may receive a configuration file response packet from the controller 23 or the convergence forwarding device 25. The configuration file response packet includes the IP address of the CM 21 and the configuration file. The fourth sending unit 2215 may send the configuration file to the CM 21 according to the IP address of the CM 21.

That the user terminal is CPE is used as an example, and the correspondence delivered by the controller 23 to the CMC 22 is a correspondence between an IP address of the CPE and the MAC address of the CM 21. The CMC 22 may perform source address verification (SAV) on a service packet from the CPE according to the received correspondence between the IP address of the CPE and the MAC address of the CM 21. A user terminal such as an STB or an eMTA may use a same operation procedure as that of the CPE, and details are not described herein.

Optionally, after step 312, the method provided in Embodiment 1 may further include: receiving, by the CMC 22, a configuration file request packet from the CM 21, where the configuration file request packet includes a configuration parameter; and sending, by the CMC 22, a packet 3005 to the controller 23, so that the controller 23 determines whether the configuration parameter is correct.

For example, the first receiving unit 2205 of the CMC 22 receives the configuration file request packet sent by the CM 21. The CMC 22 may obtain the MAC address of the CM 21 by using the method in step 302 in Embodiment 1. The first packet obtaining unit 2206 may obtain the packet 3005 according to the configuration file request packet, the configuration parameter, and the MAC address of the CM 21. The first sending unit 2207 sends the packet 3005 to the controller 23. The controller 23 may store the correspondence between the configuration parameter and the MAC address of the CM 21. The controller 23 obtains the configuration file request packet from the packet 3005. The controller 23 determines that the configuration parameter included in the configuration file request packet and the obtained MAC address of the CM 21 are the same as those in the correspondence, and requests the configuration file from the server that provides the configuration file. For example, a name of a configuration file included in the correspondence is the same as a name of the configuration file included in the configuration file request packet, and the MAC address of the CM 21 included in the correspondence is the same as the obtained MAC address of the CM 21, and in this case, it is determined that the configuration parameter included in the configuration file request packet and the obtained MAC address of the CM 21 are the same as those in the correspondence. The packet 3005 may be in a format shown in FIG. 10, FIG. 11, or FIG. 12. An OFP packet included in the packet 3005 carries the configuration file request packet.

Optionally, the method provided in Embodiment 1 may further include: determining, by the controller 23, that the configuration parameter included in the configuration file request packet and the obtained MAC address of the CM 21 are different from those in the correspondence, and notifying, by using the CMC 22, the user terminal that the configuration file is requested unsuccessfully.

Optionally, the method provided in Embodiment 1 may further include: forwarding, by the controller 23 to the user terminal by using the CMC 22, the configuration file sent by the server that provides the configuration file, so that the user terminal obtains the configuration file, where the controller 23 may add the configuration file to an OFP packet included in a packet 3006 and send the packet 3006 to the CMC 22, the CMC 22 forwards the configuration file to the user terminal, and the packet 3006 may be in a format of the packet shown in FIG. 10, FIG. 11, or FIG. 12.

That the user terminal is CPE as an example, and the correspondence stored in the controller 23 is a correspondence between an IP address of the CPE and the MAC address of the CM 21. The controller 23 may perform source address verification (SAV) on a service packet from the CPE according to the correspondence between the IP address of the CPE and the MAC address of the CM 21. A user terminal such as an STB or an eMTA may use a same operation procedure as the CPE, and details are not described herein.

Embodiment 2

FIG. 13 is a schematic diagram of a packet processing method according to Embodiment 2. The packet processing method provided in Embodiment 2 is described in detail in the following with reference to FIG. 2 to FIG. 8.

401. A user terminal sends an RS message to a CMC 22.

For example, the RS message is used to request a prefix of an IP address from a DHCP server 24 and is a packet for requesting a prefix of an IP address from the DHCP server 24.

That the user terminal is a CM 21 is used as an example, and the CM 21 may send the RS message to the CMC 22 through a physical port or a logical port. The RS message is sent by using a service flow between the CM 21 and the CMC 22, and the service flow may be identified by using an ID of the service flow.

That the user terminal is CPE is used as an example, and the CPE sends the RS message in a broadcast manner. The CM 21 may send the RS message to the CMC 22 by using a service flow, where the service flow may carry an ID of the service flow, and a correspondence exists between the ID of the service flow and a MAC address of the CM 21. A same operation procedure as that of the CPE may be used by another user terminal such as an STB or an eMTA, and details are not described herein.

402. The CMC 22 sends a packet 4001 to a controller 23.

For example, the packet 4001 includes the RS message, information about a first port, and the MAC address of the CM 21. The first port is a port through which the CMC 22 receives the RS message, and the first port may be a physical port or a logical port. The packet 4001 may be of a structure of the packet shown in FIG. 10, FIG. 11, or FIG. 12. A payload included in the packet 4001 may carry an OFP packet, and the OFP packet may carry the RS message.

For example, a first receiving unit 2205 of the CMC 22 receives the RS message sent by the CM 21. A first packet obtaining unit 2206 obtains the information about the first port and the MAC address of the CM 21. The first packet obtaining unit 2206 may generate the packet 4001 according to the RS message, the information about the first port, and the MAC address of the CM 21. A storage unit 2213 may store the correspondence between the ID of the service flow and the MAC address of the CM 21. The first packet obtaining unit 2206 may obtain the MAC address of the CM 21 according to the ID of the service flow that carries the RS message and according to the correspondence that is stored in the storage unit 2213.

For example, a first sending unit 2207 of the CMC 22 may send the packet 4001 to the controller 23; or a first sending unit 2207 may send the packet 4001 to a convergence forwarding device 25, and the convergence forwarding device 25 sends the packet 4001 to the controller 23.

403. The controller 23 sends a third DHCP packet to the DHCP server 24.

For example, a first receiving unit 2305 of the controller 23 receives the packet 4001 sent by the CMC 22. A first obtaining unit 2306 obtains the RS message, the information about the first port, and the MAC address of the CM 21 from the packet 4001. The first obtaining unit 2306 obtains the third DHCP packet, where the third DHCP packet includes the information about the first port, the MAC address of the CM 21, and the RS message. For example, the first obtaining unit 2306 may generate the third DHCP packet by using the information about the first port, the MAC address of the CM 21, and the RS message as Option content of a relay forwarding message. A first sending unit 2307 may send the third DHCP packet to the DHCP server 24.

For example, the first sending unit 2307 may send the third DHCP packet to the DHCP server 24 by using the convergence forwarding device 25; or the first sending unit 2307 may directly send the third DHCP packet to the DHCP server 24.

404. The DHCP server 24 sends a relay response message to the controller 23.

For example, a receiving unit 2405 of the DHCP server 24 receives the third DHCP packet from the controller 23. A first obtaining unit 2406 may obtain the MAC address of the CM 21 from the third DHCP packet. The first obtaining unit 2406 may obtain, according to the MAC address of the CM 21, a prefix of an IP address assigned to the user terminal.

For example, a second obtaining unit 2407 of the DHCP server 24 may obtain the relay response message according to the prefix of the IP address that is obtained by the first obtaining unit 2406 and that is assigned to the user terminal, where the relay response message includes the prefix of the IP address assigned to the user terminal, and the relay response message further includes the information about the first port and the MAC address of the CM 21. A sending unit 2410 sends the relay response message to the controller 23; or a sending unit 2410 sends the relay response message to the controller 23 by using the convergence forwarding device 25.

405. The controller 23 sends a packet 4002 to the CMC 22.

For example, the packet 4002 includes an RA message, the information about the first port, and the MAC address of the CM 21. The RA message may include the prefix of the IP address assigned by the DHCP server 24 to the user terminal. The packet 4002 may also be in a format of the packet shown in FIG. 10, FIG. 11, or FIG. 12. The packet 4002 may be in a format that is the same as that of the packet 4001, or may be in a format that is different from that of the packet 4001. A difference between the packet 4002 and the packet 4001 lies in that a payload of an OFP packet included in the packet 4002 carries the RA message.

For example, a second receiving unit 2308 of the controller 23 receives the relay response message from the DHCP server 24 or the convergence forwarding device 25. A second obtaining unit 2309 may obtain the packet 4002 according to the RA message, the obtained information about the first port, and the obtained MAC address of the CM 21. A second sending unit 2310 may send the packet 4002 to the convergence forwarding device 25, and the convergence forwarding device 25 sends the packet 4002 to the CMC 22; or a second sending unit 2310 may directly send the packet 4002 to the CMC 22.

406. The CMC 22 sends the RA message to the user terminal.

For example, a third receiving unit 2210 of the CMC 22 receives the packet 4002. A second packet obtaining unit 2211 may obtain the RA message, the information about the first port, and the MAC address of the CM 21 from the packet 4002. A third sending unit 2212 may send the RA message to the user terminal through the first port.

If the user terminal is the CM 21, the prefix of the IP address that is included in the RA message and that is assigned to the user terminal is a prefix of an IP address of the CM 21; or if the user terminal is CPE connected to the CM 21, the prefix of the IP address that is assigned by the DHCP server 24 to the user terminal is a prefix of an IP address of the CPE.

In the method provided in Embodiment 2, the CMC 22 sends a packet that includes the RS message to the controller 23, and the controller 23 generates the third DHCP packet. The controller has a DHCP relay function, and a network node such as the CMC 22 may have no DHCP relay function. In this way, the network node does not need to support a DHCP protocol, thereby decreasing complexity of the network node.

That the user terminal is the CM 21 is used as an example, and after step 405, the method provided in Embodiment 2 further includes: sending, by the controller 23, a correspondence between a configuration parameter and the MAC address of the CM 21 to the CMC 22 by using the packet 4002, where the configuration parameter includes an ID of a configuration file and an address of a server that provides the configuration file, and the server that provides the configuration file may be a TFTP server or a time of day (ToD) server.

Optionally, after step 406, the method provided in Embodiment 2 may further include: receiving, by the CMC 22, a configuration file request packet from the CM 21, where the configuration file request packet includes a configuration parameter; and determining, by the CMC 22, that the configuration parameter included in the configuration file request packet and the obtained MAC address of the CM 21 are the same as those in the correspondence delivered by the controller 23, and requesting the configuration file from the server that provides the configuration file, where the CMC 22 may request, by using a method that is the same as that in Embodiment 1, the configuration file from the server that provides the configuration file.

Optionally, the method provided in Embodiment 2 may further include: determining, by the CMC 22, that the configuration parameter included in the configuration file request packet and the obtained MAC address of the CM 21 are different from those in the correspondence delivered by the controller 23, and notifying the user terminal that the configuration file is requested unsuccessfully.

Optionally, the method provided in Embodiment 2 may further include: forwarding, by the CMC 22 to the user terminal, the configuration file sent by the server that provides the configuration file, so that the user terminal completes, by using the configuration file, configuration before assessing a network.

That the user terminal is CPE is used as an example, and the correspondence delivered by the controller 23 to the CMC 22 is a correspondence between a prefix of an IP address of the CPE and the MAC address of the CM 21. The CMC 22 may perform source address verification (SAV) on a service packet from the CPE according to the received correspondence between the prefix of the IP address of the CPE and the MAC address of the CM 21. A user terminal such as an STB or an eMTA may use a same operation procedure as the CPE, and details are not described herein.

Optionally, after step 406, the method provided in Embodiment 2 may further include: receiving, by the CMC 22, a configuration file request packet from the CM 21, where the configuration file request packet includes a configuration parameter; and sending, by the CMC 22, a packet 4003 to the controller 23, so that the controller 23 determines whether the configuration parameter is correct, where the CMC 22 may obtain the packet 4003 and send the packet 4003 to the controller 23 by using the method provided in Embodiment 1.

The controller 23 determines that the configuration parameter included in the configuration file request packet and the obtained MAC address of the CM 21 are the same as those in the correspondence, and sends the configuration file request packet to the server that provides the configuration file.

Optionally, the method provided in Embodiment 2 may further include: determining, by the controller 23, that the configuration parameter included in the configuration file request packet and the obtained MAC address of the CM 21 are different from those in the correspondence, and notifying, by using the CMC 22, the user terminal that the configuration file is requested unsuccessfully.

Optionally, the method provided in Embodiment 2 may further include: forwarding, by the controller 23 to the user terminal by using the CMC 22, the configuration file sent by the server that provides the configuration file, so that the user terminal obtains the configuration file, where a method for the controller 23 to send the configuration file to the CMC 22 is the same as the method provided in Embodiment 1.

That the user terminal is CPE as an example, and the correspondence stored in the controller 23 is a correspondence between a prefix of an IP address of the CPE and the MAC address of the CM 21. The controller 23 may perform source address verification (SAV) on a service packet from the CPE according to the correspondence between the prefix of the IP address of the CPE and the MAC address of the CM 21. A user terminal such as an STB or an eMTA may use a same operation procedure as the CPE, and details are not described herein.

Embodiment 3

Figure 14:
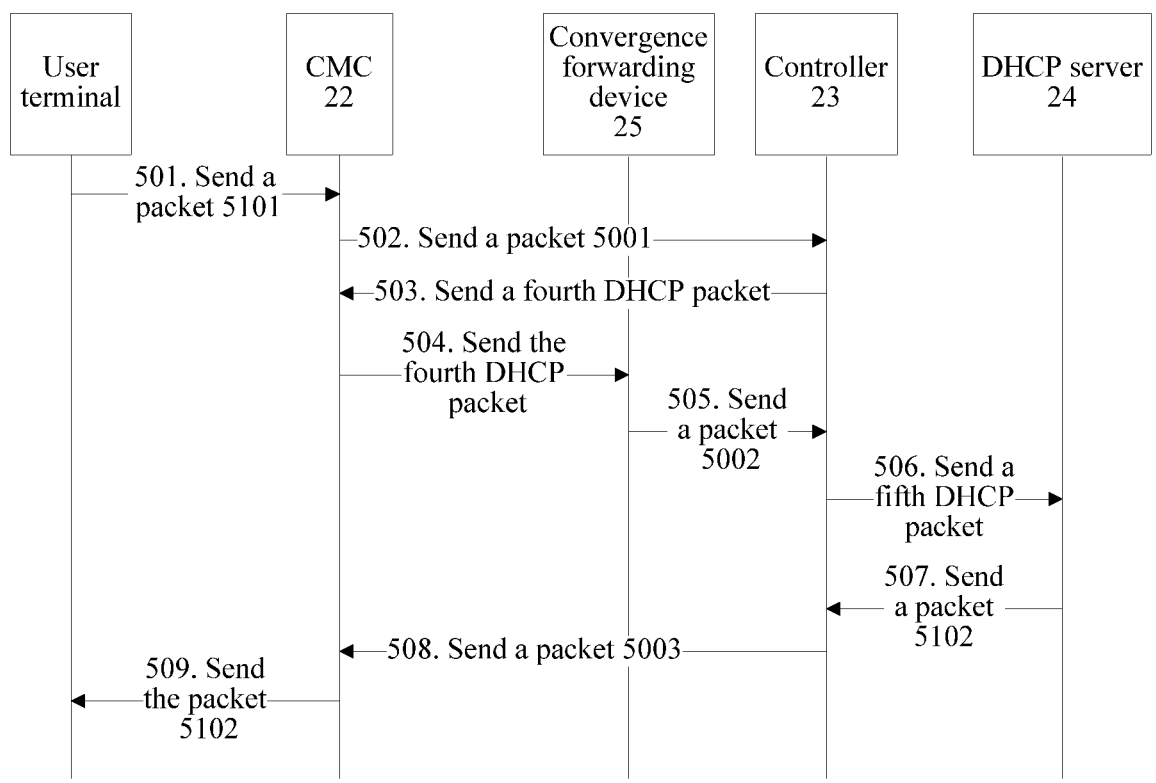
FIG. 14 is a schematic diagram of a packet processing method according to Embodiment 3.

FIG. 14 is a schematic diagram of a packet processing method according to Embodiment 3. The packet processing method provided in Embodiment 3 o is described in detail in the following with reference to FIG. 2 to FIG. 8.

501. A user terminal sends a packet 5101 to a CMC 22.

For example, the packet 5101 may be the DHCP Discover packet in Embodiment 1, the DHCP Request packet in Embodiment 1, or the RS message in Embodiment 2, and content included in the packet 5101 is not described in detail herein.

That the user terminal is a CM 21 is used as an example, and the CM 21 may send the packet 5101 to the CMC 22 through a physical port or a logical port. The packet 5101 may be carried in a service flow between the CM 21 and the CMC 22. The service flow that carries the packet 5101 may carry an ID of the service flow.

502. The CMC 22 sends a packet 5001 to a controller 23.

For example, the packet 5001 includes the packet 5101, information about a first port, and a MAC address of the CM 21. The packet 5001 is a packet except a DHCP packet. The first port is a port through which the CMC 22 receives the packet 5101, and the first port may be a physical port or a logical port. The packet 5001 may be of a structure of the packet shown in FIG. 10, FIG. 11, or FIG. 12. The packet 5101 may be carried in a payload of an OFP packet, and the OFP packet may be carried in a payload of the packet 5001.

For example, a first receiving unit 2205 of the CMC 22 receives the packet 5101 sent by the CM 21. A first packet obtaining unit 2206 obtains the information about the first port and the MAC address of the CM 21. The first packet obtaining unit 2206 may generate the packet 5001 according to the packet 5101, the information about the first port, and the MAC address of the CM 21. A storage unit 2213 may store a correspondence between the ID of the service flow and the MAC address of the CM 21. The first packet obtaining unit 2206 may obtain the MAC address of the CM 21 according to the ID that is of the service flow and that is carried in the packet 5101 and according to the correspondence that is stored in the storage unit 2213.

For example, a first sending unit 2207 of the CMC 22 may send the packet 5001 to the controller 23; or a first sending unit 2207 may send the packet 5001 to a convergence forwarding device 25, and the convergence forwarding device 25 sends the packet 5001 to the controller 23.

503. The controller 23 sends a fourth DHCP packet to the CMC 22.

For example, a first receiving unit 2305 of the controller 23 receives the packet 5001 sent by the CMC 22. A first obtaining unit 2306 obtains the packet 5101, the information about the first port, and the MAC address of the CM 21 from the packet 5001. The first obtaining unit 2306 obtains the fourth DHCP packet, where the fourth DHCP packet includes the information about the first port and the MAC address of the CM 21. For example, the first obtaining unit 2306 may add the information about the first port and the MAC address of the CM 21 to an option 82 field of the packet 5101, so as to obtain the fourth DHCP packet. A first sending unit 2307 may send the fourth DHCP packet to the CMC 22.

504. The CMC 22 sends the fourth DHCP packet to the convergence forwarding device 25.

For example, a second receiving unit 2208 of the CMC 22 receives the fourth DHCP packet sent by the controller 23. A second sending unit 2209 sends the fourth DHCP packet to the convergence forwarding device 25.

505. The convergence forwarding device 25 sends a packet 5002 to the controller 23.

For example, a structure of the convergence forwarding device 25 may be the same as a structure of the CMC 22. After receiving the fourth DHCP packet, the convergence forwarding device 25 may obtain the packet 5002 by using a method for the CMC 22 to process the packet 5101, and details are not described herein. The packet 5002 may include the fourth DHCP packet, the first port, a third port, and the MAC address of the CM 21, where the third port may be a port through which the convergence forwarding device 25 receives the DHCP packet, and the third port may be a physical port or a logical port. The packet 5002 may be in a format of the packet shown in FIG. 10, FIG. 11, or FIG. 12, that is, the fourth DHCP packet may be carried in a payload of an OFP packet, and the OFP packet may be carried in a payload of the packet 5002.

506. The controller 23 sends a fifth DHCP packet to a DHCP server 24.

For example, the controller 23 may send the fifth DHCP packet to the DHCP server 24 by using the method in Embodiment 1 or Embodiment 2, and details are not described herein.

Steps 507 to 509 are optional. The DHCP server 24 may send a packet 5102 to the user terminal by using the convergence forwarding device 25 and the CMC 22; or the DHCP server 24 may send a packet 5102 to the user terminal by using a method of steps 507 to 509 shown in FIG. 14.

507. The DHCP server 24 sends the packet 5102 to the controller 23.

For example, if the packet 5101 is a DHCP Discover packet, the packet 5102 is a DHCP Offer packet. The DHCP Offer packet is the same as the DHCP Offer packet in Embodiment 1, and details are not described herein. If the packet 5101 is a DHCP Request packet, the packet 5102 is a DHCP ACK packet. The DHCP ACK packet is the same as the DHCP ACK packet in Embodiment 1, and details are not described herein. If the packet 5101 is an RS message, the packet 5102 is an RA message. The RA message is the same as the RA message in Embodiment 2, and details are not described herein.

For example, the DHCP server 24 may send the packet 5102 to the controller 23 by using the method in Embodiment 1 or Embodiment 2, and details are not described herein.

508. The controller 23 sends a packet 5003 to the CMC 22.

For example, the packet 5003 includes the packet 5102, the information about the first port, and the MAC address of the CM 21. The packet 5003 is a packet except a DHCP packet. The packet 5003 may be of a structure of the packet shown in FIG. 10, FIG. 11, or FIG. 12. The packet 5102 may be carried in a payload of an OFP packet, and the OFP packet may be carried in a payload of the packet 5003.

For example, the controller 23 may send the packet 5003 to the CMC 22 by using the method in Embodiment 1 or Embodiment 2.

Optionally, the controller 23 may further send the packet 5003 to the convergence forwarding device 25. The convergence forwarding device 25 may send the packet 5003 to the CMC 22 according to the third port.

509. The CMC 22 sends the packet 5102 to the user terminal.

For example, the CMC 22 may obtain the packet 5102 by using the method in Embodiment 1 or Embodiment 2. The CMC 22 may send the packet 5102 to the user terminal by using the method in Embodiment 1 or Embodiment 2.

In the method provided in Embodiment 3, the CMC 22 or the convergence forwarding device 25 may have no DHCP relay function, that is, the CMC 22 or the convergence forwarding device 25 does not need to generate a DHCP packet. The controller 23 has a DHCP relay function, that is, the controller 23 generates a DHCP packet according to a received packet that includes the packet 5101 or the packet 5102. The method provided in Embodiment 3 helps decrease complexity of a network node.

In the foregoing embodiments, the CMC 22, the convergence forwarding device 25, and the DHCP server 24 separately communicate with the controller 23 through an extended port. The CMC 22, the convergence forwarding device 25, the controller 23, and the DHCP server 24 may forward a packet according to a configured forwarding rule or forwarding entry. Alternatively, each of the CMC 22, the convergence forwarding device 25, the controller 23, and the DHCP server 24 can learn a network node connected to each port, and each of the foregoing nodes may forward a packet according to the network node connected to each port and according to a forwarding rule. For example, the CMC 22 may send the packet 3001 or the packet 4001 to the controller 23 according to a first forwarding rule. The CMC 22 may send an RA message to the user terminal according to a second forwarding rule. The CMC 22 may send a DHCP packet to the convergence forwarding device 24 according to a third forwarding rule. Each forwarding process of each node is not described herein by using examples one by one.

In the foregoing embodiments, packets such as the packet 3001 to the packet 3004 and the packet 4001 to the packet 4003 are all packets except a DHCP packet.

The foregoing processor may be a microprocessor or the processor may be any conventional processor, decoder, or the like. The steps of the method disclosed with reference to the embodiments may be directly performed by a hardware processor, or may be performed by using a combination of hardware in the processor and a software module. When it is implemented by using software, code that implements the foregoing functions may be stored in a computer-readable medium, where the computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or another optical disk storage, a disk storage medium or another disk storage device, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

Finally, it should be noted that the foregoing embodiments are merely intended for exemplarily describing the technical solutions other than limiting the present embodiments. Although the present embodiments and benefit effects of the present embodiments are described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the scope of the claims of the present embodiments.

What is claimed is:

1. A method, comprising:
   receiving, by a network node, a first packet, wherein the first packet requests an Internet Protocol (IP) address for a user terminal;
   obtaining, by the network node, a second packet comprising the first packet and additional information associated with address requesting, wherein the second packet is a packet other than a Dynamic Host Configuration Protocol (DHCP) packet; and
   sending, by the network node, the second packet to a device different from the network node, so that the device obtains a DHCP packet according to the second packet.

2. The method according to claim 1, wherein the additional information comprises information about a port through which the network node receives the first packet.

3. The method according to claim 1, wherein the additional information comprises a Media Access Control (MAC) address of the user terminal.

4. The method according to claim 1, wherein the additional information comprises information about a port through which the network node receives the first packet, and a Media Access Control (MAC) address of the user terminal.

5. The method according to claim 1, further comprising:
   receiving, by the network node, a third packet, wherein the third packet comprises the IP address for the user terminal; and
   sending, by the network node, the third packet to the device different from the network node.

6. The method according to claim 5:
   wherein the first packet is a DHCP Discover packet, and the third packet is a DHCP Offer packet;
   wherein the first packet is a DHCP Request packet, and the third packet is a DHCP ACK packet; or
   wherein the first packet is a router solicitation (RS) message, the third packet is a relay response message, and the relay response message comprises a router advertisement (RA) message.

7. The method according to claim 1, wherein a payload of the second packet comprises an OpenFlow protocol (OFP) packet, and a payload of the OFP packet carries the first packet.

8. The method according to claim 7, wherein:
   the second packet is an Institute of Electrical and Electronics Engineers (IEEE) 1904.2 protocol packet, wherein a subtype field of the IEEE 1904.2 protocol packet identifies that the IEEE 1904.2 protocol packet comprises the OFP packet, and wherein a payload of the IEEE 1904.2 protocol packet carries the OFP packet and the additional information associated with address requesting;
   the second packet is an Ethernet operation, administration and maintenance (ETH OAM) packet, wherein a code field of the ETH OAM packet identifies that the ETH OAM packet comprises the OFP packet, and wherein a data field of the ETH OAM packet carries the OFP packet and the additional information associated with address requesting; or
   the second packet is an optical network terminal management and control interface (OMCI) protocol packet, wherein a message identifier field in the OMCI protocol packet identifies that the OMCI protocol packet comprises the OFP packet, and wherein a message contents field comprised in the OMCI protocol packet carries the OFP packet and the additional information associated with address requesting.

9. The method according to claim 1, wherein the additional information associated with address requesting is comprised in the second packet and is separate from the first packet.

10. A method comprising:
    receiving, by a device, a second packet sent by a network node, wherein the second packet comprises a first packet and additional information associated with address requesting, wherein the first packet requests an Internet Protocol (IP) address from a Dynamic Host Configuration Protocol (DHCP) server, and wherein the second packet is a packet other than a DHCP packet;

obtaining, by the device, a DHCP packet based on the second packet, wherein the DHCP packet comprises the additional information associated with address requesting; and sending, by the device to the DHCP server, the DHCP packet.

11. The method according to claim 10, wherein the additional information comprises information about a port through which the network node receives the first packet.

12. The method according to claim 10, wherein the additional information comprises a Media Access Control (MAC) address of a user terminal.

13. The method according to claim 10, wherein the additional information comprises information about a port through which the network node receives the first packet, and a Media Access Control (MAC) address of a user terminal.

14. The method according to claim 10, further comprising:

receiving, by the device, a third packet sent by the DHCP server, wherein the third packet comprises an IP address of a user terminal;

obtaining, by the device, a fourth packet, wherein the fourth packet comprises the third packet and the additional information associated with address requesting; and sending, by the device to the network node, the fourth packet.

15. The method according to claim 14, further comprising:

adding, by the device, a configuration parameter to the third packet, wherein the configuration parameter comprises an identifier of a configuration file and an identifier of a server that provides the configuration file; and sending, by the device to the network node, the configuration parameter using the third packet.

16. The method according to claim 10, wherein the additional information associated with address requesting is separate from the first packet.

17. A network node, comprising:

a processor; and a non-transitory computer readable storage medium storing a program for execution by the processor, the program including instructions to:

receive a first packet, wherein the first packet requests an Internet Protocol (IP) address for a user terminal;

obtain a second packet comprising the first packet and additional information associated with address requesting, wherein the second packet is a packet other than a Dynamic Host Configuration Protocol (DHCP) packet; and send the second packet to a device different from the network node, so that the device obtains a DHCP packet according to the second packet.

18. The network node according to claim 17, wherein the additional information comprises information about a port through which the network node receives the first packet.

19. The network node according to claim 17, wherein the additional information comprises a Media Access Control (MAC) address of the user terminal.

20. The network node according to claim 17, wherein the additional information comprises information about a port through which the network node receives the first packet, and a Media Access Control (MAC) address of the user terminal.

21. The network node according to claim 17, wherein the program further includes instructions to:

receive a third packet sent by a DHCP server, wherein the third packet comprises the IP address for the user terminal; and send the third packet to the device different from the network node.

22. The network node according to claim 21, wherein:

the first packet is a DHCP Discover packet, and the third packet is a DHCP Offer packet;

the first packet is a DHCP Request packet, and the third packet is a DHCP acknowledge (ACK) packet; or the first packet is a router solicitation (RS) message, the third packet is a relay response message, and the relay response message comprises a router advertisement (RA) message.

23. The network node according to claim 17, wherein the addition information associated with address requesting is separate from the first packet and comprised in the second packet.

24. A device, comprising:

a processor; and a non-transitory computer readable storage medium storing a program for execution by the processor, the program including instructions to:

receive a second packet sent by a network node, wherein the second packet comprises a first packet and additional information associated with address requesting, wherein the first packet requests an Internet Protocol (IP) address from a Dynamic Host Configuration Protocol (DHCP) server for a user terminal, and wherein the second packet is a packet other than a DHCP packet;

obtain a DHCP packet based on the second packet, wherein the DHCP packet comprises information about a port and a media access control (MAC) address of the user terminal; and send the DHCP packet to the DHCP server.

25. The device according to claim 24, wherein the additional information comprises information about the port, and the port is a port through which the network node receives the first packet.

26. The device according to claim 24, wherein the additional information comprises a Media Access Control (MAC) address of the user terminal.

27. The device according to claim 24, wherein the additional information comprises information about a port through which the network node receives the first packet, and a Media Access Control (MAC) address of the user terminal.

28. The device according to claim 24, wherein the program further includes instructions to:

receive a third packet sent by the DHCP server, wherein the third packet comprises an IP address of the user terminal;

obtain a fourth packet, wherein the fourth packet comprises the third packet, and the additional information associated with address requesting; and send the fourth packet to the network node.

29. The device according to claim 28, wherein the program further comprises instructions to:

add a configuration parameter to the third packet, wherein the configuration parameter comprises an identifier of a configuration file and an identifier of a server that provides the configuration file; and send the configuration parameter to the network node by using the third packet.

30. The device according to claim 24, wherein the additional information associated with address requesting is separate from the first packet.

\* \* \* \* \*